United States Patent [19]
Nagata et al.

[11] Patent Number: 5,210,635
[45] Date of Patent: May 11, 1993

[54] MULTIBEAM SCANNING SYSTEM

[75] Inventors: Shinichi Nagata; Yoshio Ono, both of Kyoto, Japan

[73] Assignee: Dainippon Screen Mfg. Co., Ltd., Japan

[21] Appl. No.: 510,466

[22] Filed: Apr. 7, 1990

[30] Foreign Application Priority Data

Apr. 17, 1989 [JP] Japan .................................. 1-96957
Jul. 14, 1989 [JP] Japan ................................ 1-183308

[51] Int. Cl.$^5$ .................................................. G02B 26/08
[52] U.S. Cl. .................................. 359/198; 359/204; 359/213
[58] Field of Search ............................... 350/6.1–6.91; 346/308; 250/235, 236, 234; 359/196–226, 232–236

[56] References Cited

U.S. PATENT DOCUMENTS

| | | | |
|---|---|---|---|
| 4,293,218 | 10/1981 | Nielsen et al. | 359/209 |
| 4,728,965 | 3/1988 | Kessler et al. | 350/174 |
| 4,796,961 | 1/1989 | Yamada et al. | 350/6.8 |
| 4,861,983 | 8/1989 | Sasada et al. | 250/235 |
| 4,946,234 | 8/1990 | Sasada et al. | 350/6.7 |
| 4,969,699 | 11/1990 | Noguchi et al. | 359/205 |
| 4,980,549 | 12/1990 | Baldwin | 250/235 |

FOREIGN PATENT DOCUMENTS

| | | | |
|---|---|---|---|
| 25118 | 2/1986 | Japan . | |
| 138821 | 6/1987 | Japan | 359/205 |
| 2-25827 | 1/1990 | Japan . | |
| 105110 | 4/1990 | Japan | 359/204 |
| 149816 | 6/1990 | Japan | 359/205 |

Primary Examiner—Bruce Y. Arnold
Assistant Examiner—Thong Nguyen
Attorney, Agent, or Firm—Ostrolenk, Faber, Gerb & Soffen

[57] ABSTRACT

An optical beam scanning system has a multibeam control mechanism (4) with a beam interval adjusting mechanism for adjusting an interval between beam spots on a recording surface. The mechanism has at least one plane parallel plate (471–474). The plate is placed on an optical path. The plate is turned on an axis which is perpendicular to the optical path to thereby change the interval while maintaining the diameter of the beam spots on the recording surface. A pair of prisms may be installed in place of the plane parallel plate. The prisms are relatively moved in a parallel manner to thereby change the interval while maintaining the diameter of the beam spots.

12 Claims, 28 Drawing Sheets

F/G. 1
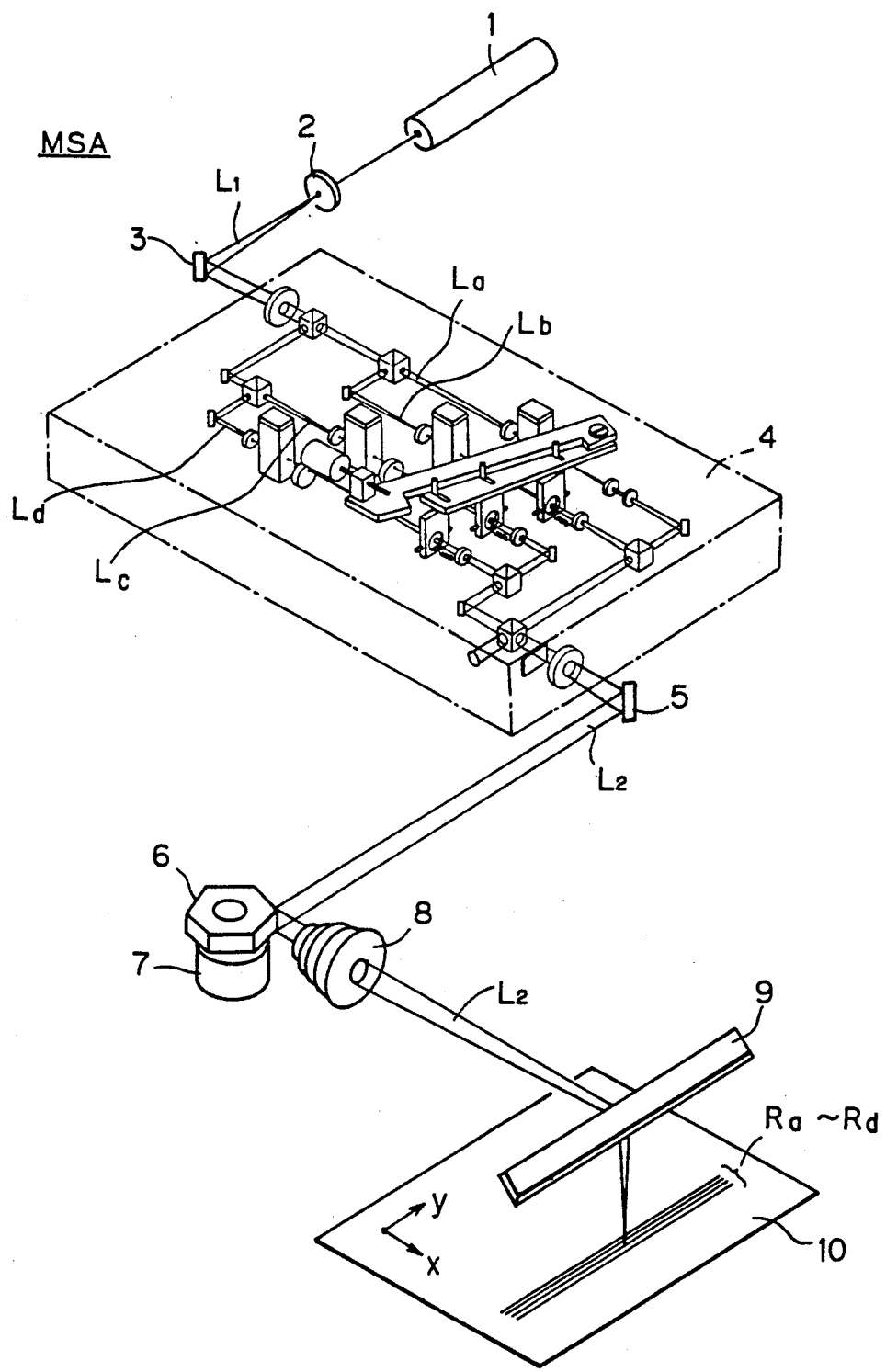

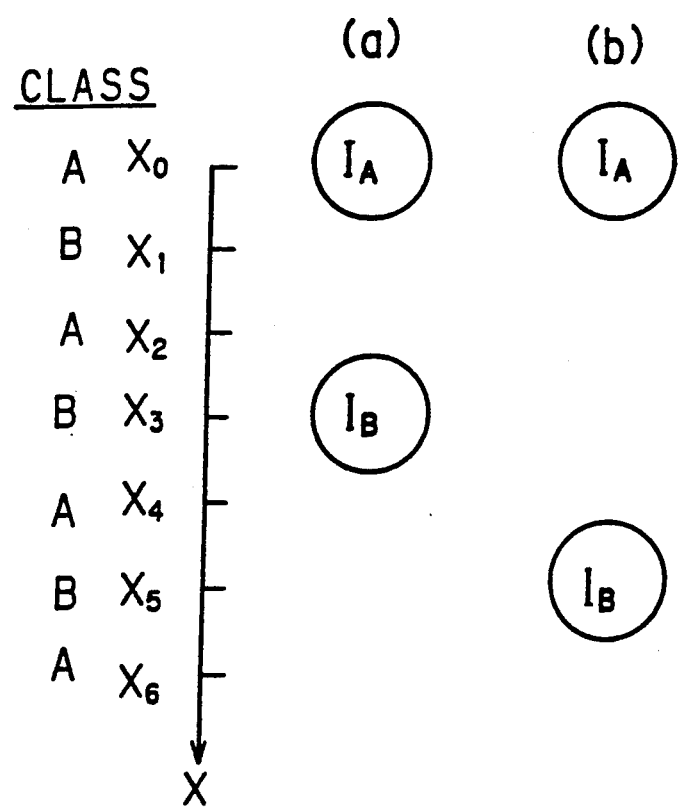

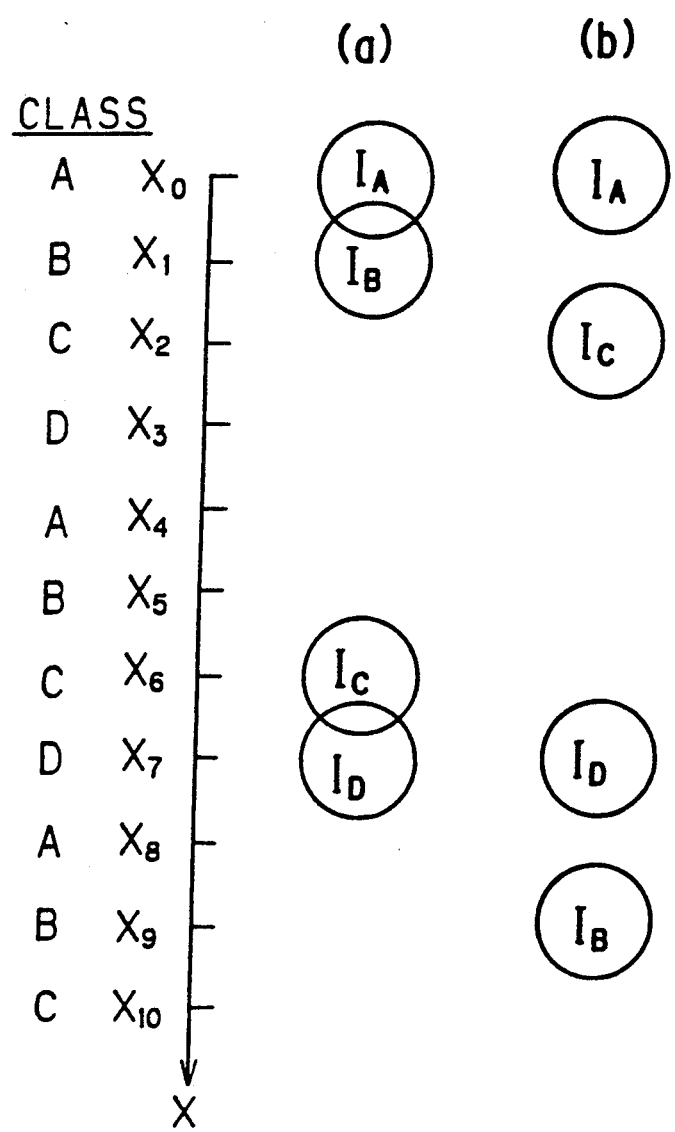

Nc = 8

FIG.21
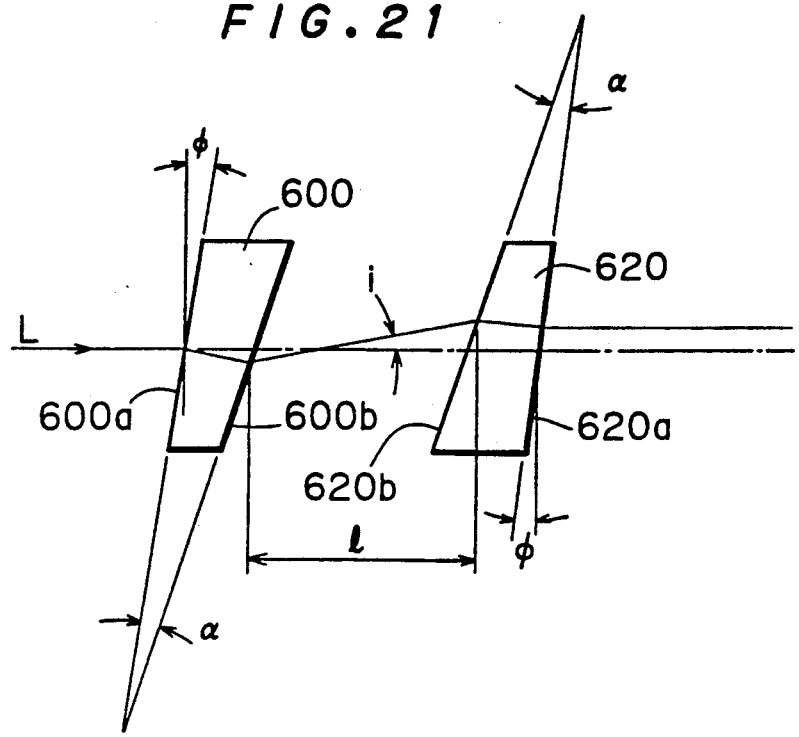
FIG.22
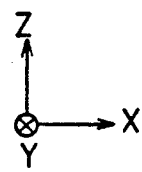
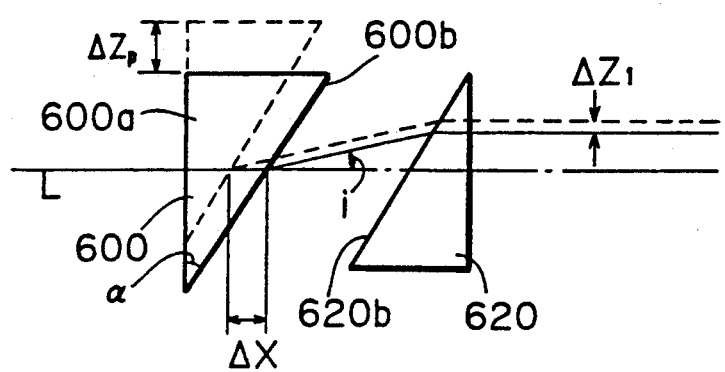

MULTIBEAM SCANNING SYSTEM

BACKGROUND OF THE INVENTION

1. Field of the Invention

The present invention relates to a multibeam scanning system for use in an apparatus for recording an image, such as a laser plotter and a color image scanner. In particular, the present invention relates to a multibeam scanning system with a beam interval adjuster for changing an interval of beam spots on a recording surface while maintaining a spot diameter.

2. Description of the Prior Art

An apparatus for recording an image, such as an image scanner and a printer, often includes a multibeam scanning system for focusing a plurality of optical beams on a photosensitive material to expose the same. The use of a multibeam scanning system reduces exposure time. When an image to be reproduced is a halftone image, each halftone dot is formed with a prescribed number of scanning lines.

An image scanner used in a printing process must be able to change an interval of halftone dots formed on a reproduced image. Even when the interval of halftone dots is changed, the number of scanning lines needed to form one halftone dot is not usually changed. Accordingly, the interval of beam spots on photosensitive material should be changed according to the interval of halftone dots.

An apparatus for changing the interval between beam spots is described in Japanese Patent Laying Open Gazette No. 60-169820. Since this apparatus changes the interval between beam spots with a zoom lens, the spot diameter increases as the interval between beam spots increases.

However, when the spot diameter increases, the distribution of the intensity of the beam spots becomes flatter. For example, a spot diameter of 20 $\mu$m becomes 60 $\mu$m when the interval between beam spots is multiplied by three with a zoom lens. If halftone dots are formed with these large optical beams, the boundaries of the halftone dots are blurred. This problem is especially important in connection with a flat bed type image scanner, which scans a long scanning line in every main scanning operation.

Therefore, it is desirable to change the beam spot interval while maintaining the beam spot diameter, especially in a flat bed type image scanner.

SUMMARY OF THE INVENTION

The present invention is directed to an optical beam scanning system for scanning a recording surface with a plurality of optical beams, comprising: means for producing a plurality of optical beams each of which is a non-parallel bundle of rays, beam interval adjusting means for adjusting an interval of beam spots on the recording surface comprising at least one plane parallel plate each of which is placed on each optical path of the plurality of optical beams except one, and turning means for turning the plane parallel plate on each axis perpendicular to the optical path to thereby change the interval, means for combining the plurality of optical beams leaving the beam interval adjusting means to form a composite optical beam, periodical deflection means for periodically deflecting the composite optical beam, and an image formation lens system for focusing the composite optical beam deflected by the periodical deflection means on the recording surface.

Preferably, the turning means turns the plane parallel plate by moving at least one application point each of which is related to each plane parallel plate in a first direction parallel to the optical path, and the application point is located a prescribed distance from the axis in a second direction perpendicular to the optical path.

The turning means may have at least two plane parallel plates and at least two application points for two optical beams, and the turning means may move the application points by respective displacements, where ratios of the displacements are represented in integers.

The turning means may further comprise holders for holding the respective plane parallel plates, where the application points are applied to respective parts of the holders, and a turning plate for rotating on a prescribed axis of rotation to thereby move the application points in the first direction.

According to an aspect of the present invention, the beam interval adjusting means comprises plane parallel plates placed on respective optical paths of the plurality of optical beams, and turning means for turning the plane parallel plates on respective axes perpendicular to the optical paths to thereby change the interval.

According to another aspect of the present invention, the beam interval adjusting means comprises at least one pair of first and second deflection means each of which is placed on each optical path of the plurality of optical beams except one, the first deflection means deflecting each optical beam at a prescribed angle in a first direction, the second deflection means deflecting each optical beam leaving the first deflection means at the prescribed angle in a second direction opposite to the first direction, and parallel moving means for relatively moving the pair of first and second deflection means in a parallel manner to thereby change the interval.

Preferably, the parallel moving means has at least two pairs of first and second deflection means for two optical beams, and the parallel moving means relatively moves the pairs of first and second deflection means by respective displacements, where ratios of the displacements are represented in integers.

Each pair of first and second deflection means may have a pair of prisms each of which deflects an optical beam at the prescribed angle, and the pair of prisms may be set up so that inner opposite surfaces of the pair of prisms are parallel to each other and that outer opposite surfaces of the pair of prisms are parallel to each other.

According to still another aspect of the present invention, the beam interval adjusting means comprises pairs of first and second deflection means placed on respective optical paths of the plurality of optical beams, the first deflection means deflecting each optical beam at a prescribed angle in a first direction, the second deflection means deflecting each optical beam leaving the first deflection means at the prescribed angle in a second direction opposite to the first direction, and parallel moving means for relatively moving the pairs of first and second deflection means in a parallel manner to thereby change the interval.

Accordingly, an object of the present invention is to provide a multibeam scanning system which can change the interval between spots without changing the diameter of the spots.

These and other objects, features, aspects and advantages of the present invention will become more apparent from the following detailed description of preferred embodiments of the present invention when taken in conjunction with the accompanying drawings.

BRIEF DESCRIPTION OF THE DRAWINGS

FIGS. 1 and 2A are perspective views of a multibeam scanning system;

FIG. 4A shows a portion of the adjusting mechanism shown in FIG. 2A, with distances between the fulcrum point and other points relevant to operation of the invention; FIG. 4B shows, in side view, angular movements of the plane parallel plate shown in FIG. 4A; and FIG. 4C shows the distances shown in FIG. 4A schematically;

FIG. 8A shows the lack of interference between two neighboring beam spots wherein the scanning pitch is larger than the diameter of the beam spots; and FIG. 8A shows two beam spots wherein the scanning pitch is reduced, bu showing that the beam spots do not interfere with each other if they are perpendicularly polarized;

FIGS. 9 and 10A through 10E illustrate examples of an interlace scanning method. In particular, FIG. 9 illustrates an example of interlace scanning; FIGS. 10A, 10B, 10C, 10D and 10E show interlace scanning methods using 2, 3, 4, 5 and 8 beam spots;

FIGS. 21, 22, 23, 24A and 24B illustrate examples of deflecting means; and

DETAILED DESCRIPTION OF THE PREFERRED EMBODIMENTS

Figure 2A:
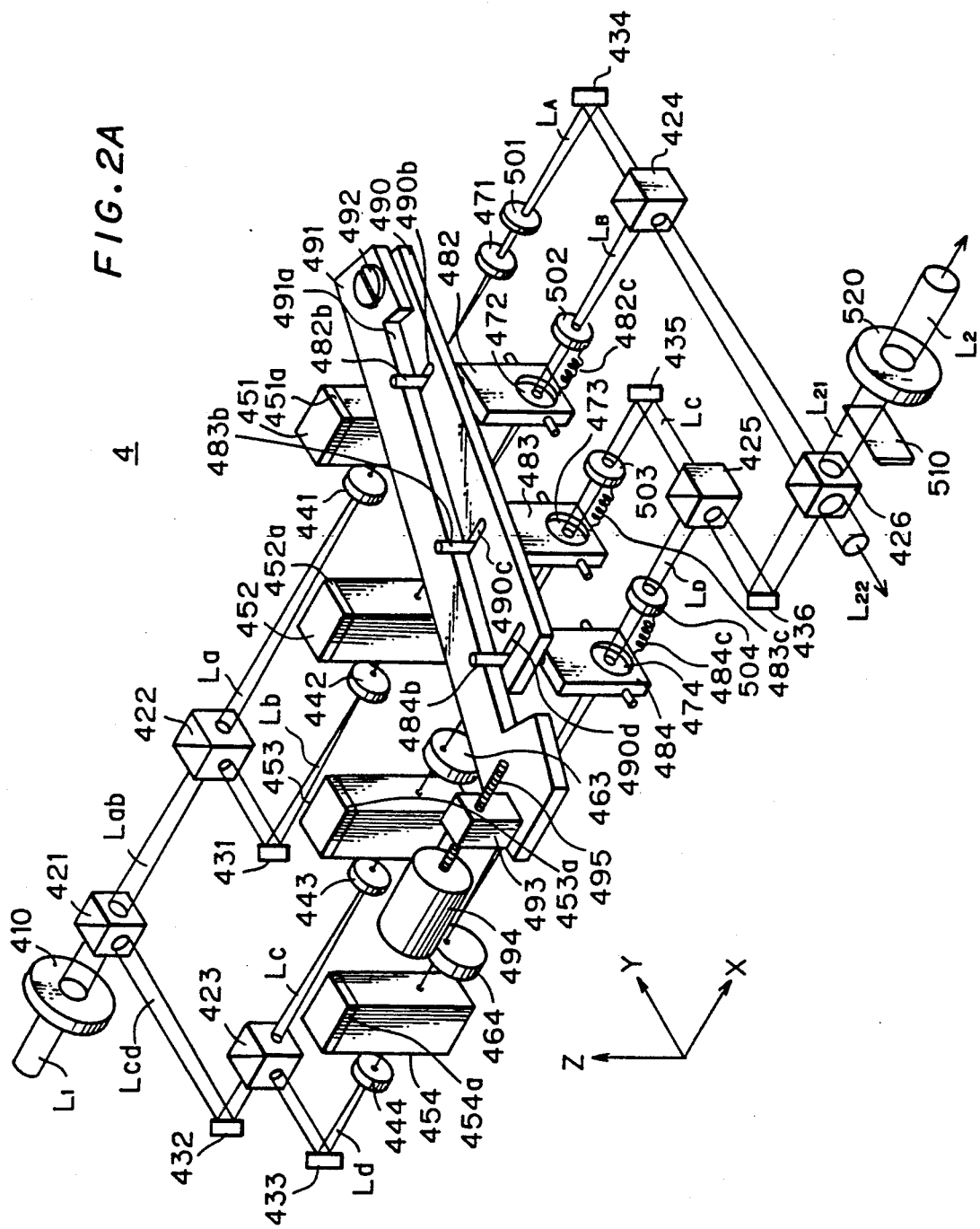

FIG. 1 is a perspective view of a multibeam scanning system MSA in accordance with the present invention. In this system, a laser 1 emits a laser beam $L_1$ which is diverged by a first lens 2. The divergent laser beam $L_1$ is reflected by a mirror 3 and introduced into a multibeam control mechanism 4.

The multibeam control mechanism 4 includes a beam interval adjusting mechanism. The adjusting mechanism splits the laser beam $L_1$ into four optical beams $L_a$, $L_b$, $L_c$ and $L_d$, controls the on-off action of the beams $L_a$–$L_d$ and controls the intervals between the beams $L_a$–$L_d$, as described later in detail.

The mechanism 4 further includes means for combining the beams $L_a$–$L_d$ to form a seemingly-single optical beam $L_2$. The composite beam $L_2$ is reflected by a mirror 5 and deflected by a polygon mirror 6. The deflected beam $L_2$ is focused on a recording surface 10 a scan lens 8 and a mirror 9. Traces $R_a$–$R_d$ of spots formed on the recording surface 10 by the composite optical beam $L_2$ are illustrated in an exaggerated fashion in FIG. 1.

A motor 7 rotates the polygon mirror 6, whereby the composite optical beam $L_2$ is scanned on the recording surface 10 in a main scanning direction Y.

Figure 2B:
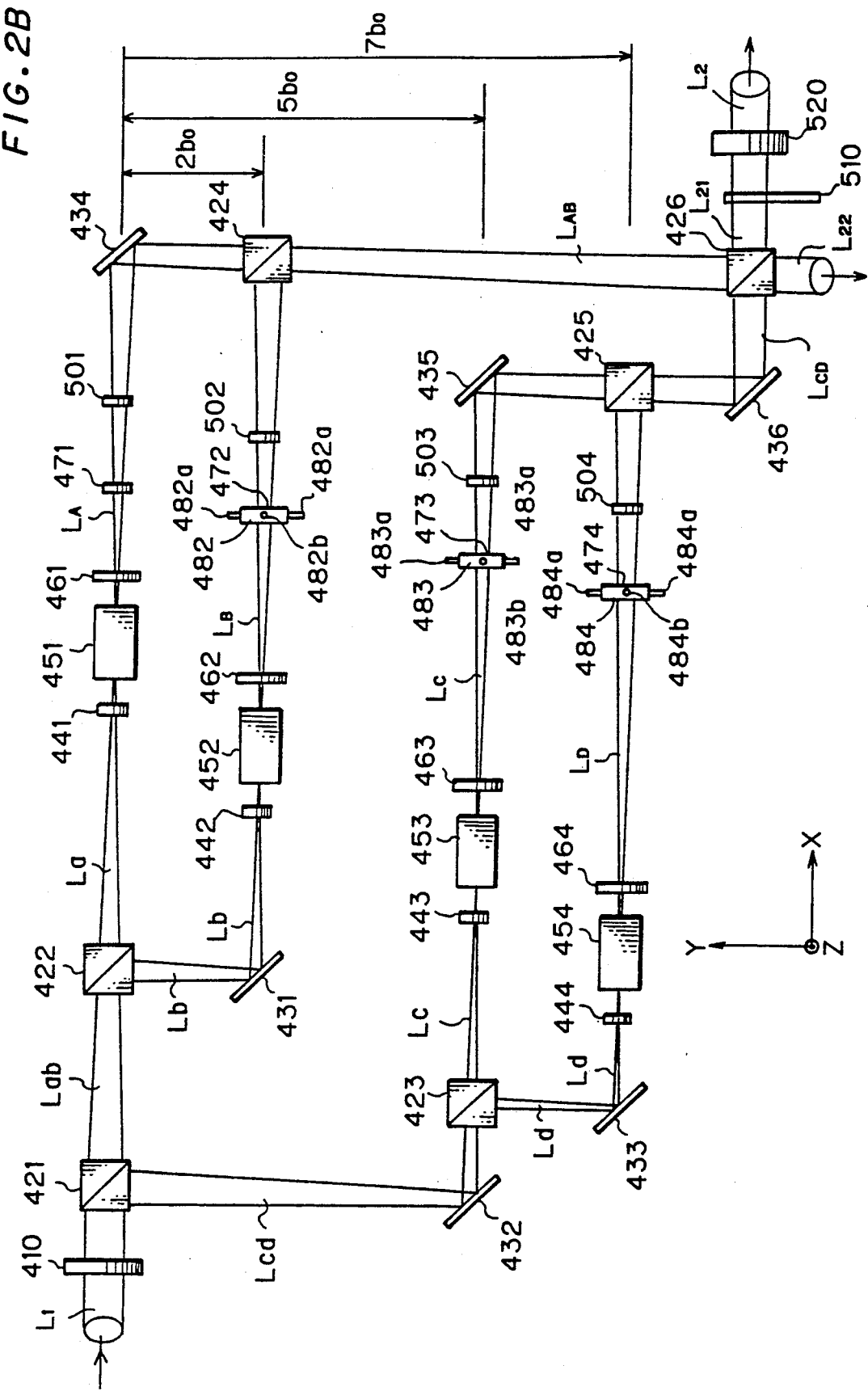
FIG. 2B is a plan view of the multibeam scanning system.

FIG. 2A is an enlarged perspective view of the multibeam control mechanism 4, and FIG. 2B is its plan view.

The laser beam $L_1$ is converged toward AOM's 451–454 by a condenser lens 410. The laser beam $L_1$ is linearly polarized light whose plane of polarization is inclined at 45 degrees with respect to a horizontal plane.

The laser beam $L_1$ leaving the condenser lens 410 is first split into two equally intense optical beam $L_{ab}$ and $L_{cd}$ by a non-polarization beam splitter 421. The be $L_{ab}$ is split further into two optical beam $L_a$ and $L_b$ by a polarization beam splitter 422. The optical be $L_b$ is reflected by a mirror 431 in a direction which is parallel to a direction X. The optical beam $L_{cd}$ is reflected by a mirror 432 and is split into two optical beams $L_1$ and $L_d$ by a polarization beam splitter 423. The optical be $L_d$ is reflected by a mirror 433 in a direction which is parallel to the direction X. The optical beams $L_a$–$L_d$ are equally intense. The beams $L_a$–$L_d$ will be referred to as first-channel to fourth-channel optical beams, respectively.

The beams $L_a$–$L_d$ pass through first plane parallel plates 441–444 and converge in the AOM's 451–454, respectively. Optical path lengths from the condenser lens 410 to the respective AOM's are equal to each other.

The plates 441–444 are used to adjust distances from respective transducers 451a–454a to image formation positions of the optical beams $L_a$–$L_d$ in the AOM's 451–454 Each of the plates 441–444 can be turned on a horizontal axis which is perpendicular to the beams $L_a$–$L_d$, that is, an axis which is parallel to the direction Y. The plates 441–444 are turned by adjusting respective supporting mechanisms (not shown) When the inclinations of the plates 441–444 are adjusted, the heights of the optical beams $L_a$–$L_d$ in the AOM's 451–454 (or positions in the direction Z) are changed. Since the transducers 451a–454a are placed at the upper ends of the AOM's 451–454, distances from respective transducers 451a–454a to the image formation positions are changed as the heights of the optical beams $L_a$–$L_d$ in the AOM's are changed. Accordingly, delay times of the AOM's 451–454, i.e., the times from the inputting of on-off signals to the transducers 451a–454a to the actual modulation of the optical beams $L_a$–$L_d$, can be equalized by adjusting the inclinations of the first plane parallel plates 441–444.

The AOM's 451–454 emit first order diffracted beams $L_A$–$L_D$. The diffracted beams $L_A$–$L_D$ are inclined with respect to the horizontal X-Y plane The beams $L_A$–$L_D$ are returned to horizontal by decentering lenses 461–464. The beams $L_A$–$L_B$ are then introduced into the beam interval control mechanism which includes second plane parallel plates 471–474.

The plates 472–474 are supported by respective holders 482–484. The holders 482–484 have fulcrum pins 482a–484a which extend in the direction Y. That is, the pins 482a–484a are perpendicular to the optical paths. The pin levers 482b–484b extend upward from the upper ends of the holders 482–484.

The pin levers 482b–484b extend through pin guide holes 490b–490d of a pin guide plate 490. The pin guide plate 490 is located over the holders 482–484. The holes 490b–490d extend in the X direction. Portions of the pin levers 482b–484b which project over the plate 490 contact a side surface 491a of an arm plate 491.

The plates 490 and 491 are connected by a connection pin 492. The pin 492 permits rotation of the plate 491 in both directions. A nut portion 493 is fixed to the other end of the arm plate 491. The nut portion 493 is engaged with a screw 495 which is driven by a motor 494. The motor 494 is fixed on a base (not shown) of the multibeam control mechanism 4. When the motor 494 is driven, the arm plate 491 rotates about the axis of the connection pin 492. The lower ends of the holders 482–484 are connected to third plane parallel plates 502–504 with springs 482c–484c, respectively. As a result, the lower ends of the holders 482–484 are pulled in the X direction such that the pin levers 482b–484b are pressed against the arm plate 491.

The beam interval adjusting mechanism comprises the second plane parallel plates 472–474, the holders 482–484, the pin guide plate 490, the arm plate 491, the nut portion 493, the motor 494 and the screw 495. For convenience of illustration, the pin guide plate 490, the arm plate 491, the nut portion 493, the motor 494 and the screw 495 are not shown in FIG. 2B.

A fulcrum of the arm plate 491 (the center of the connection pin 492) is located directly above the optical path of the beam $L_A$. The fulcrum and the levers 482b–484b are horizontally aligned. Further, ratios of distances from the fulcrum to the pin levers 482b–484b are 2:5:7. This arrangement is determined on account of an interlace scanning method which is described later in detail.

When the screw 495 is rotated by the motor 494, the arm plate 491 rotates within a horizontal plane such that the pin levers 482b–484b move in the X direction. As a result, the plates 472–474 are inclined about the fulcrum pins 482a–484a. The intervals between the beam spots of the beams $L_A$–$L_D$ on the recording surface 10 are adjusted by inclining the plates 472–474, as described later. The plate 471 is provided to equalize the optical path lengths of the four channels. The plate 471 need not be inclined. The plate 471 is fixed on the base of the mechanism 4. The surfaces of the plate 471 are perpendicular to the beam $L_A$.

The optical beams $L_A$–$L_D$ leaving the second plane parallel plates 471–474 pass through the third plane parallel plates 501–504. The plates 501–504 are used to minutely adjust initial positions of the four beam spots on the recording surface 10, the initial positions being the positions of the beam spots on the surface 10 when the plates 472–474 are perpendicular to the optical paths The initial positions of the beam spots in the subscanning direction are made equal to each other by separately adjusting the inclinations of the plates 501–504.

The beams $L_A$–$L_D$ are combined to form the composite beam $L_2$ as follows: First, the beam $L_A$ is reflected by a mirror 434. The beam $L_A$ is then combined with the be $L_B$ by a polarization beam splitter 424 to form a composite optical beam $L_{AB}$. Meanwhile, the beam $L_C$ is reflected by a mirror 435 and combined with the be $L_D$ by a polarization beam splitter 425 to form a composite optical beam $L_{CD}$. Finally, the composite optical beam $L_{AB}$ and $L_{CD}$ are combined by a non-polarization beam splitter 426 to form a composite optical beam $L_{21}$. Another composite optical beam $L_{22}$ is produced by the non-polarization beam splitter 426. The beam $L_{22}$ is not used to expose the recording surface 10. Therefore, the intensity of the composite optical beam $L_{21}$ is about half that of the sum of the beams $L_A$–$L_D$.

The composite optical beam $L_{21}$ includes zero order light and first order light produced by the AOM's 451–454. The zero order light is eliminated by a zero order light cutter 510. The zero order light is not used because it is not on-off controlled by the AOM's 451–454. Since the zero order light runs under the first order light, the zero-order light cutter 510 is placed at the lower part of the composite optical beam $L_{21}$. Only the first order light can pass the cutter 510.

The composite optical beam $L_2$ (without the zero order light) passes through the collimator lens 520, thereby becomes a parallel bundle of rays, and is emitted from the multibeam control mechanism 4.

The plane of polarization of the beams $L_A$ and $L_C$ is horizontal. The plane of polarization of the beams $L_B$ and $L_D$ is vertical. That is, the planes of polarization of neighboring optical beams are perpendicular to each other. This prevents interference which would otherwise occur when the beam spots are close to each other on the recording surface 10.

Figure 3:
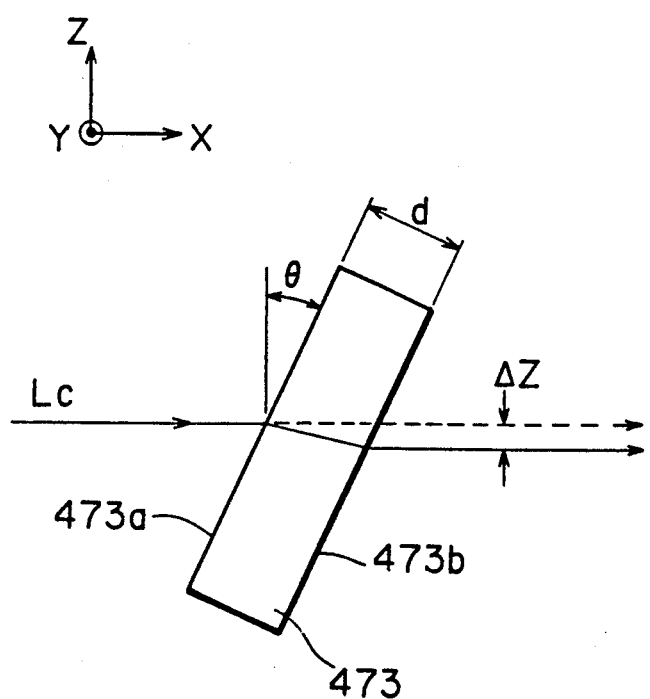
FIG. 3 schematically illustrates a relationship between an inclination of a plane parallel plate and parallel displacement of an optical beam.

FIG. 3 schematically illustrates parallel movement of an optical beam caused by the inclination of a plane parallel plate. The optical beam $L_C$ propagates in the X direction. The plane parallel plate 473 is placed on the optical path and its parallel surfaces 473a and 473b are inclined at an angle $\theta$ with respect to a plane which is perpendicular to the optical path. The parallel displacement $\Delta Z$ of the beam $L_C$ is determined by the following equations:

$$\Delta Z = d(\sin\theta - A) \quad (1a)$$

$$A = \cos\theta \cdot \sin\theta/(n^2 - \sin^2\theta)^{\frac{1}{2}} \quad (1b)$$

where d is the thickness of the plate, and n is the refractive index of the plate.

Figure 4A:
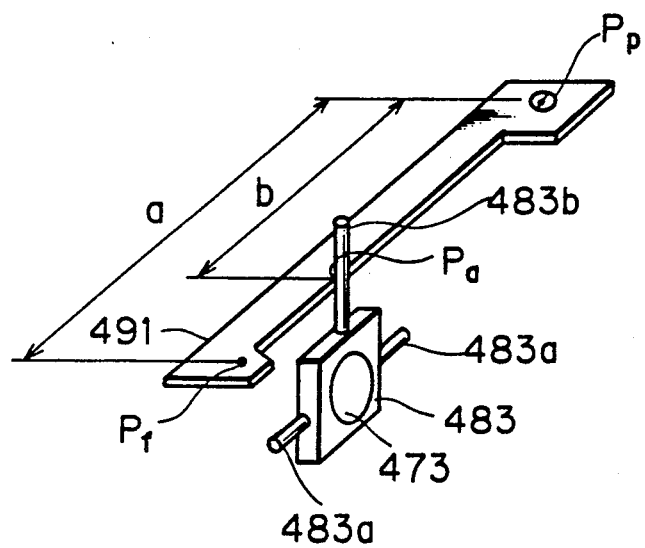
FIGS. 4A through 4C schematically illustrate a relationship between movement of a beam interval adjusting mechanism and an inclination of a plane parallel plate. In particular.
Figure 4C:
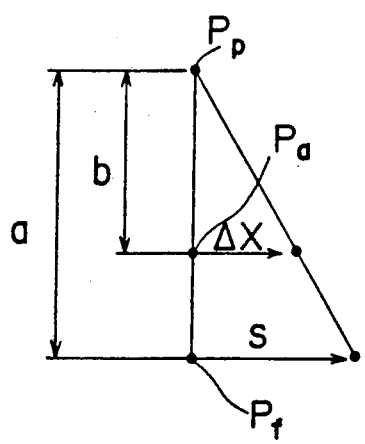
Figure 4B:
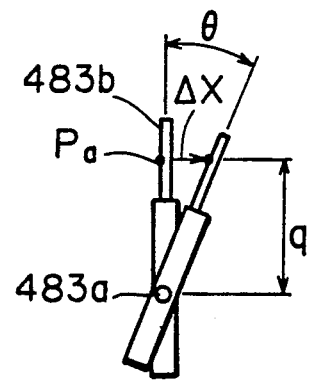

FIGS. 4A through 4C illustrate the relationship between the displacement of the arm plate 491 and the inclination of the plate 473. Assuming, as shown in FIG. 4A, that a distance from the fulcrum $P_p$ of the arm plate 491 to an application point $P_a$ (at the pin lever 483b) is b; that a distance from the fulcrum $P_p$ to a forcing point $P_f$ at which the screw 495 applies force to the arm plate 491 is a; and that a height from the fulcrum pin 483a to the application point $P_a$ is g, when the forcing point $P_f$ is moved by a displacement s (FIG. 4C) the application point $P_a$ is moved by a displacement $\Delta X$. In this case, the inclination angle $\theta$ of the plane parallel plate 473 is given by the following equations:

$$\theta = \tan^{-1}(\Delta X/q) \quad (2a)$$

$$\Delta X = bs/a \quad (2b)$$

The following equations are obtained by substituting equations (2a) and (2b) into equations (1a) and (1b):

$$\Delta Z = dcs \cdot N/M \quad (3a)$$

$$M = (1 + c^2 s^2)^{\frac{1}{2}} \quad (3b)$$

$$N = 1 - 1/(M^2 n^2 - c^2 s^2)^{\frac{1}{2}} \quad (3c)$$

$$c = b/aq \quad (3d)$$

The vertical displacement $\Delta Z$ of the optical beam $L_C$ with respect to the displacement s of the forcing point $P_f$ can be determined from equations (3a)–(3d). Table 1 shows calculated values of the displacement s, the inclination angle $\theta$, and the displacement $\Delta Z$, when:

$a = 120$ mm, $b = 90$ mm, $q = 15$ mm, $d = 3$ mm, $n = 1.515$

TABLE 1

| s (mm) | $\theta$ (deg) | $\Delta Z$ (mm) | $R_L$ (%) |
|---|---|---|---|
| 0 | 0 | 0 | — |
| 0 | 2.86 | 0.051 | 0 |
| 2 | 5.71 | 0.102 | 0.04 |
| 4 | 11.31 | 0.204 | 0.16 |
| 6 | 16.70 | 0.307 | 0.32 |
| 8 | 21.80 | 0.410 | 0.47 |
| 10 | 26.57 | 0.513 | 0.52 |
| 12 | 30.96 | 0.615 | 0.45 |
| 14 | 34.99 | 0.715 | 0.19 |
| 16 | 38.66 | 0.814 | −0.26 |
| 18 | 41.99 | 0.910 | −0.92 |
| 20 | 45.00 | 1.002 | −1.78 |

A linearity $R_L$ shown in Table 1 is defined by the following equation:

$$R_L = (\Delta Z - 0.015s)/0.051s \times 100 \ (\%) \quad (4)$$

The linearity $R_L$ is the deviation of the actual parallel displacement $\Delta Z$ (determined by the equation 3a)) from an ideal parallel displacement $\Delta Z_i$, which is determined by the following linear equation of the displacement of the foregoing point $P_f$:

$$\Delta Z_i = ks \ (k = 0.051) \quad (5)$$

The coefficient k is equal to the parallel displacement $\Delta Z$ when the displacement s of the forcing point $P_f$ is 1 mm, as shown in Table 1.

Figure 5:
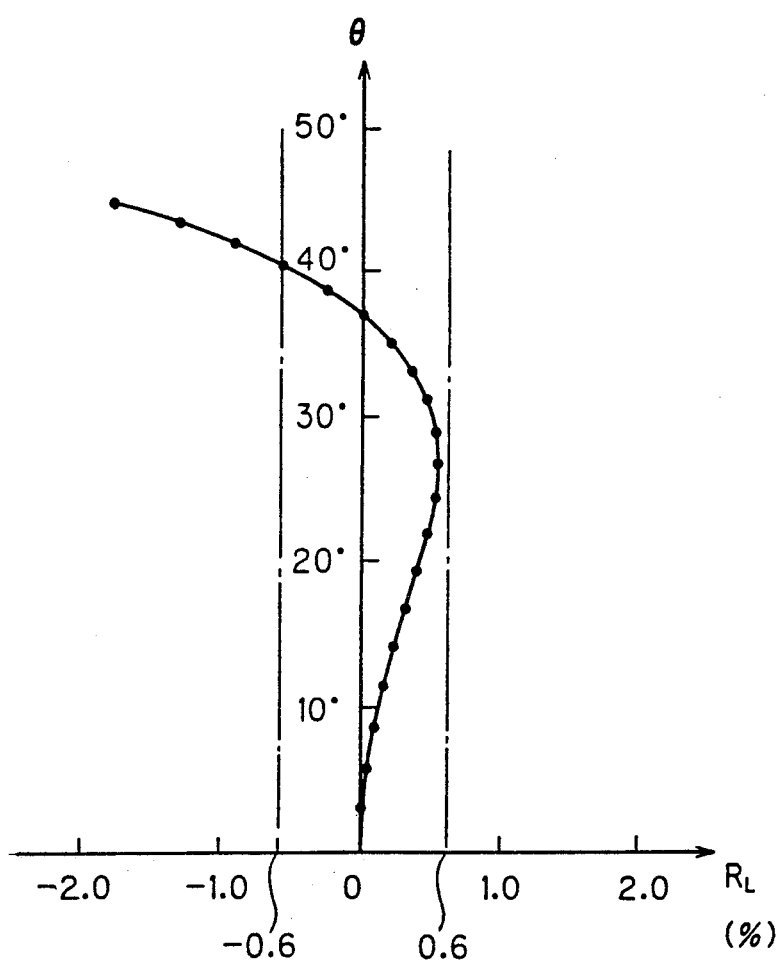
FIG. 5 is a graph showing the relationship of linearity of the multibeam interval adjusting mechanism to the inclination angle of the plane parallel plates used in the invention.

FIG. 5 is a graph showing the relationship between the inclination angle $\theta$ and the linearity $R_L$. When the inclination angle $\theta$ is between 0 degrees and about 40 degrees, the linearity $R_L$ between the displacement s and the displacement $\Delta Z$ is within ±0.6%.

Consequently, the parallel displacement $\Delta Z$ determined by the equations (3a)–(3d) is approximated by linear function of the displacement s (such as the equation (5)). On the other hand, only the term M in equation (3b) and the term N in equation (3c) are not proportional to the displacement s in equations (3a)–(3d). Further, the value N/M in equation (3a) can be replaced by a constant $m_o$ if the displacement s is small. By replacing the value N/M by the constant $m_o$, equation (3a) can be rewritten as follows:

$$\Delta Z = dcsm_O = dsm_O \cdot b/aq \quad (6)$$

Among the terms in equation (6), only the distance b (i.e., the distance between the fulcrum of the arm plate 491 to the forcing point of the pin lever) depends on the position of the optical path. Therefore, equation (6) can be rewritten as follows:

$$\Delta Z = k_O sb \quad (7)$$

where $k_O \ (= dm_O/aq)$ is a constant.

As shown in FIG. 2B, if the distance between the first channel and the second channel is $2b_O$, the ratios of the distances from the first channel to the second, third and fourth channels in the Y direction are $2b_O$:$5b_O$:$7b_O$. By substituting $2b_O$, $5b_O$ and $7b_O$ for b in equation (7), parallel displacements $\Delta Z_B$, $\Delta Z_C$ and $\Delta Z_D$ of the beams $L_B$, $L_C$ and $L_D$ can be determined with reference to the displacement s as follows:

$$\Delta Z_B = 2k_O b_O s = 2k_1 s \quad (8a)$$

$$\Delta Z_C = 5k_O b_O s = 5k_1 s \quad (8b)$$

$$\Delta Z_D = 7k_O b_O s = 7k_1 s \quad (8c)$$

where the coefficient $k_1 \ (= k_O b_O)$ is a constant.

According to equations (8a)–(8c), the parallel displacement $\Delta Z_B$–$\Delta Z_D$ of the beams $L_B$–$L_D$ with respect to the displacement s of the arm plate 491 maintain the ratios of 2:5:7. The ratios are equal to those of the distances from the first channel to the second through fourth channels.

When the second through fourth beams $L_B$–$L_D$ are displaced in response to the movement of the arm plate 491, the positions of the beam spots on the recording surface 10 are changed accordingly, as described later in detail. Therefore, the intervals between the four beam spots formed by the optical beams $L_A$–$L_D$ are changed while the ratios of the distances between the beam spots are maintained at 2:5:7. That is, the ratios of the beam spot intervals are maintained at 2:3:2.

Figure 6:
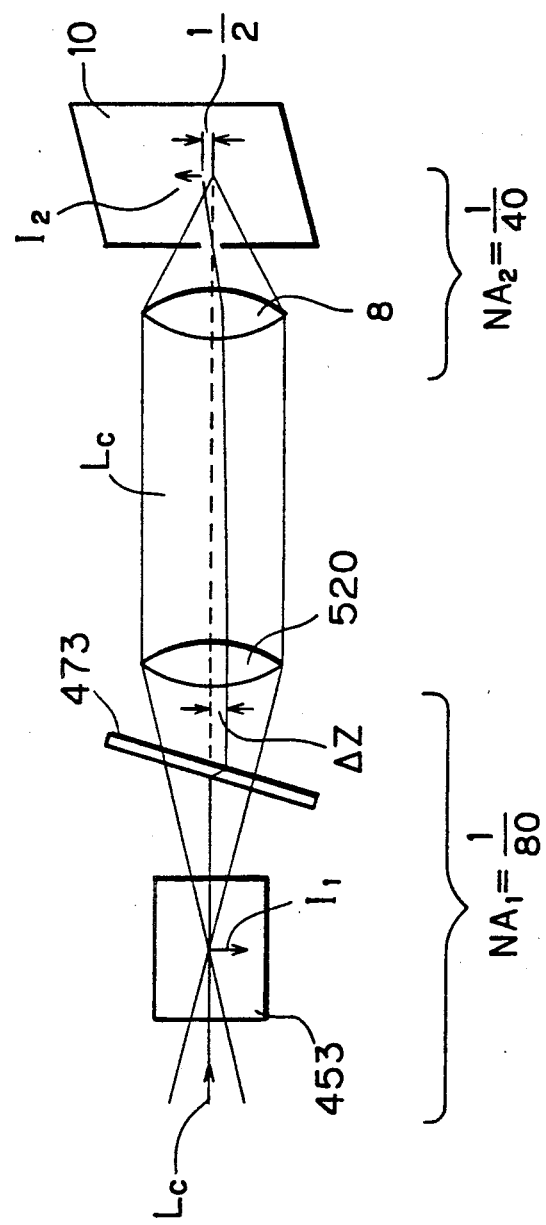
FIG. 6 schematically illustrates a relationship between parallel displacement of an optical beam and displacement of a beam spot on a surface to be scanned.

FIG. 6 illustrates the relationship between the displacement of the optical beams in the beam interval adjusting mechanism and the displacement of the beam spots on the recording surface. The optical beam $L_C$ is focused in the AOM 453, passes through the second plane parallel plate 473, the collimator lens 520 and the scan lens 8, and is finally focused again on the recording surface 10. An image formation plane in the AOM 453 and the recording surface 10 are conjugate to each other. This is also the case with the AOM's 451, 452 and 454. The actual images $I_1$ and $I_2$ of the optical beam $L_C$ are circles, but they are drawn as arrows for convenience of illustration.

The size of the image $I_2$ is half that of the image $I_1$. A numerical aperture $NA_1$ with respect to the optical beam $L_C$ focused in the AOM 453 is 1/80, and a numerical aperture $NA_2$ of the optical beam $L_2$ focused on the recording surface 10 is 1/40. Therefore, an angular magnification ($NA_2/NA_1$) with respect to the optical beams $L_C$ and $L_2$ is two, and a lateral magnification, which is the reciprocal of the angular magnification, is ½. The lateral magnification is the ratio of the size of the image $I_2$ on the recording surface 10 to the size of the image $I_1$ in the AOM 453.

Since the lateral magnification with respect to the optical beams $L_C$ and $L_2$ is ½, when the optical beam $L_C$ is displaced by $\Delta Z$ in the direction Z by the inclination of the plate 473, the beam spot on the recording surface 10 is displaced by ½·$\Delta Z$.

Accordingly, only if an optical beam passing through the plane parallel plate is a nonparallel bundle of rays, that is, only if an optical beam is a convergent ray or a divergent ray, the lateral magnification with respect to the image formation planes in the AOM and on the recording surface 10 is not zero, and therefore the beam spot on the recording surface 10 is displaced in response to the parallel displacement of the optical beam passing through the plane parallel plate. The plane parallel plates for this purpose can be located at arbitrary positions between the AOM's 451-454 and the means for combining the four optical beams.

The plate 473 moves the optical beam $L_C$ without changing the angular orientation of the beam $L_C$. The inclination of the plate 473 does not change the size of the image $I_1$. Spherical abberation and astigmatism caused by the plate 473 may be neglected.

The relationship between the displacement of the optical beam due to the inclination of the plate and the corresponding displacement of the beam spot on the recording surface is common to the second to fourth channels. When the optical beams $L_B$-$L_D$ are parallel displaced by the ratios of 2:5:7 in the Z direction, the beam spots on the recording surface 10 are displaced by the ratios of 2:5:7.

Figure 7:
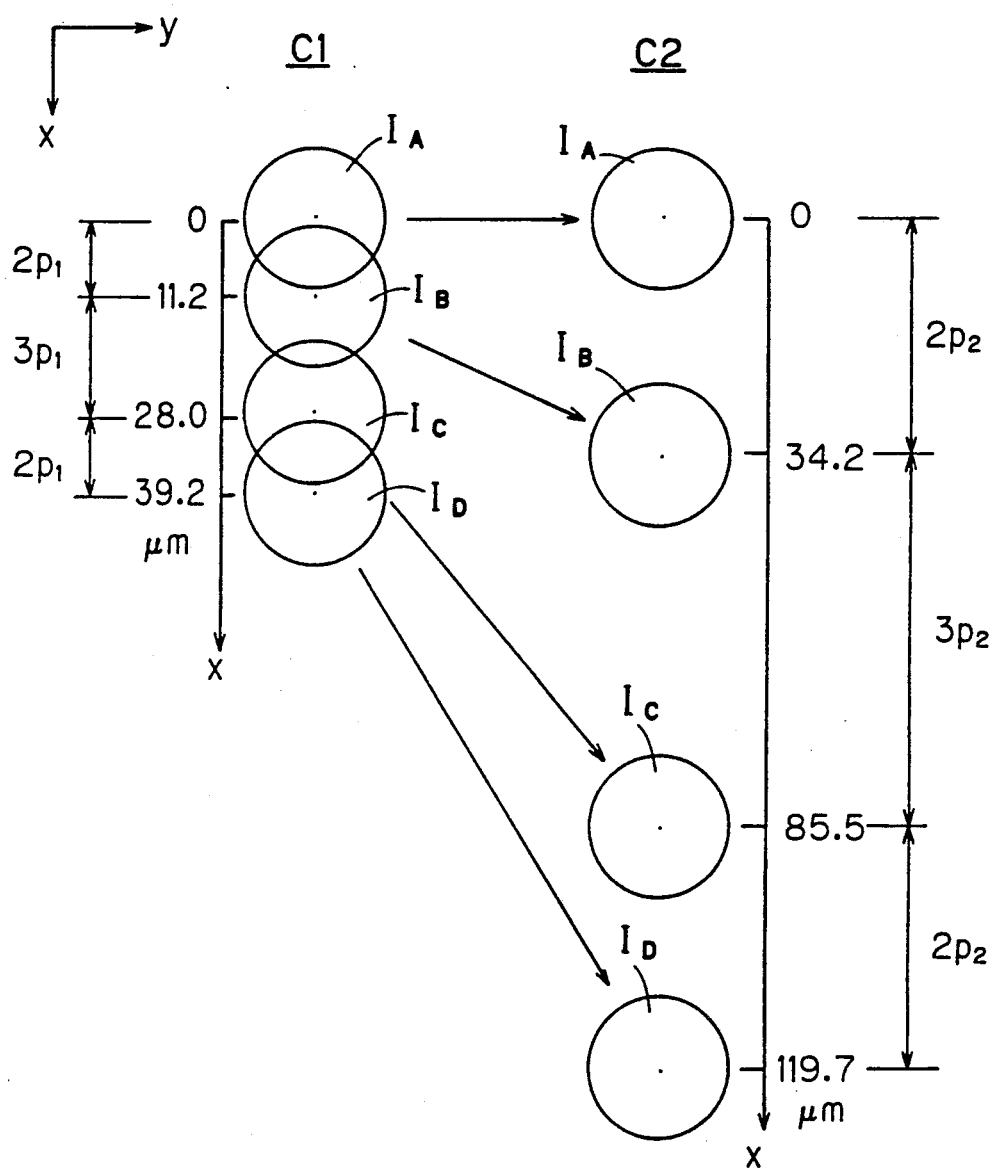
FIG. 7 schematically illustrates a method of adjusting a beam spot interval.

FIG. 7 illustrates positional changes of the beam spots on the recording surface when the beam spot intervals are changed between states C1 and C2. First, at state C1, the beam spots $I_B$-$I_D$ of the optical beams $L_B$-$L_D$ are 11.2 μm, 20.8 μm and 39.2 μm away from the beam spot $I_A$ of the optical beam $L_A$ in the subscanning direction (the X direction). The ratios between the beam spot intervals are 2:3:2. The beam spots $I_A$-$I_D$ are each a circle having a diameter of about 20 μm.

State C2 is obtained by operating the beam interval adjusting mechanism. In state C2, the distances from the beam spot $I_A$ to the beam spots $I_B$-$I_D$ are 34.2 μm, 85.5 μm and 119.7 μm, respectively. The ratios of the beam spot intervals are maintained at 2:3:2. The diameter of the beam spots $I_A$-$I_D$ is maintained at about 20 μm.

The states C1 and C2 correspond to screen rulings of 200 per inch and 65 lines per inch, respectively. As described above, even if the beam spot intervals are multiplied by three, the size of the beam spots and the ratios of the beam spot intervals are maintained.

The ratios of the intervals between the beam spots $I_A$-$I_D$ need not be 2:3:2. The ratios can be simply 1:1:1 (equal to the scanning pitch) without affecting the advantages of the present invention.

Figures 8A, 8B:
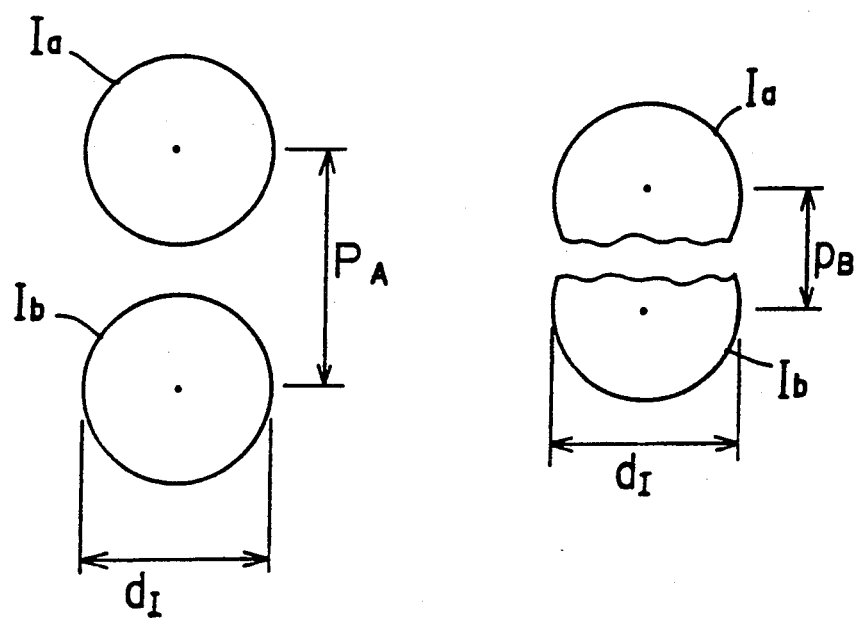
FIGS. 8A and 8B illustrate interference between beam spots. In particular.

As illustrated in FIG. 8A, there will be no interference between two neighboring spots $I_a$ and $I_d$ when the scanning pitch $P_A$ is larger than the diameter $d_I$ of the beam spots $I_a$ and $I_b$. However, as shown in FIG. 8B, when a scanning pitch $p_B$ is almost equal to or smaller than the spot diameter $d_I$, the neighboring spots $I_a$ and $I_b$ interfere with each other such that the shapes of the beam spots $I_a$ and $I_b$ are deformed.

If the beam spots $I_a$ and $I_b$ are perpendicularly polarized, the beam spots $I_a$ and $I_b$ do not interfere with each other and thus are not deformed, even in the case of FIG. 8B. However, if the scanning pitch $p_B$ is reduced further, beam spots at every other scanning position begin to interfere with each other.

To cope with this problem, the intervals of the beam spots $I_A$-$I_D$ are larger than, and preferably multiples of, the subscanning pitch. Assuming that the subscanning pitch is p, the intervals between the beam spots $I_A$-$I_D$ are set at 2p, 3p and 2p (FIG. 7). This is called interlace scanning.

Figure 9:
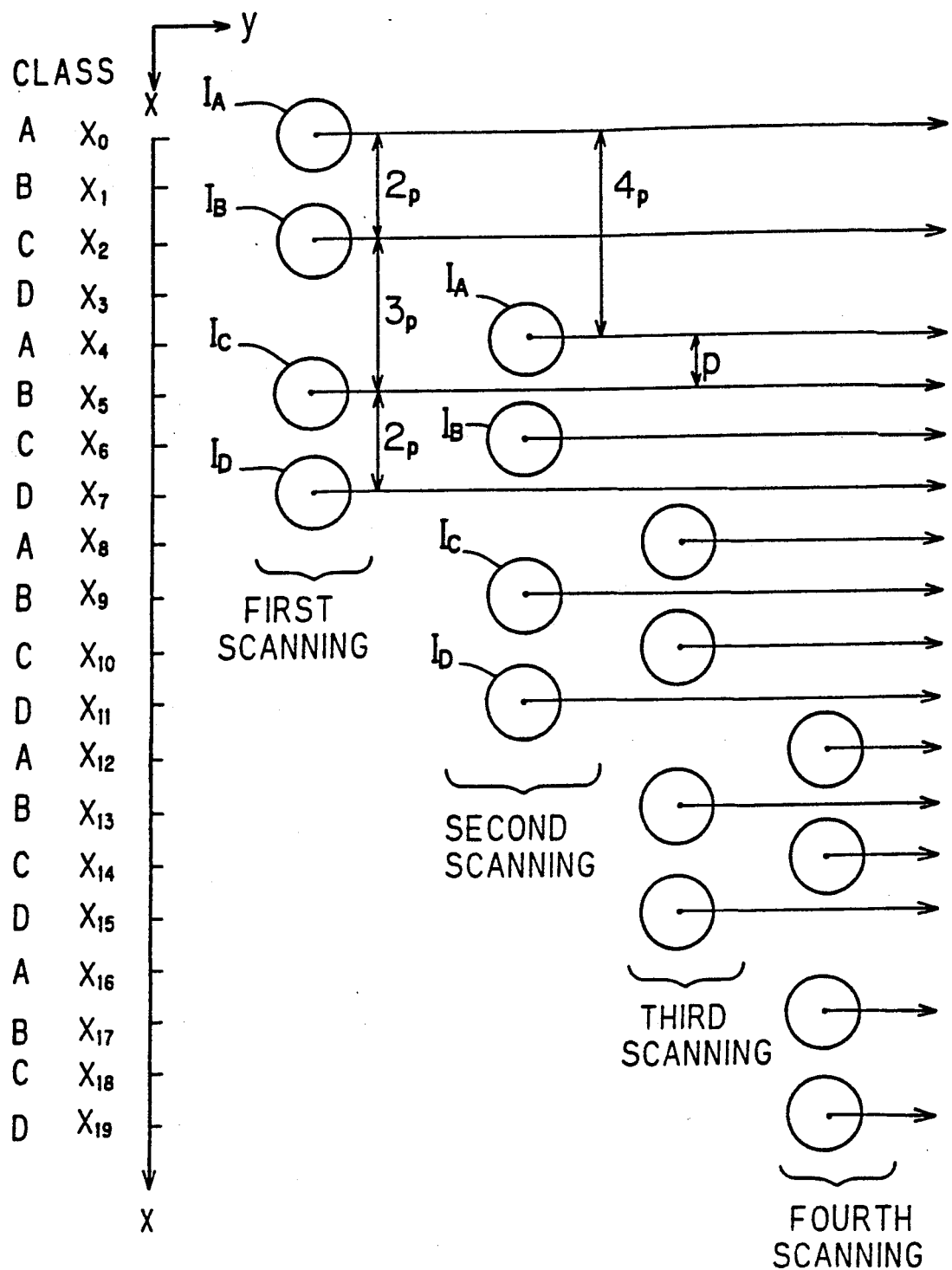
Figure 10B:
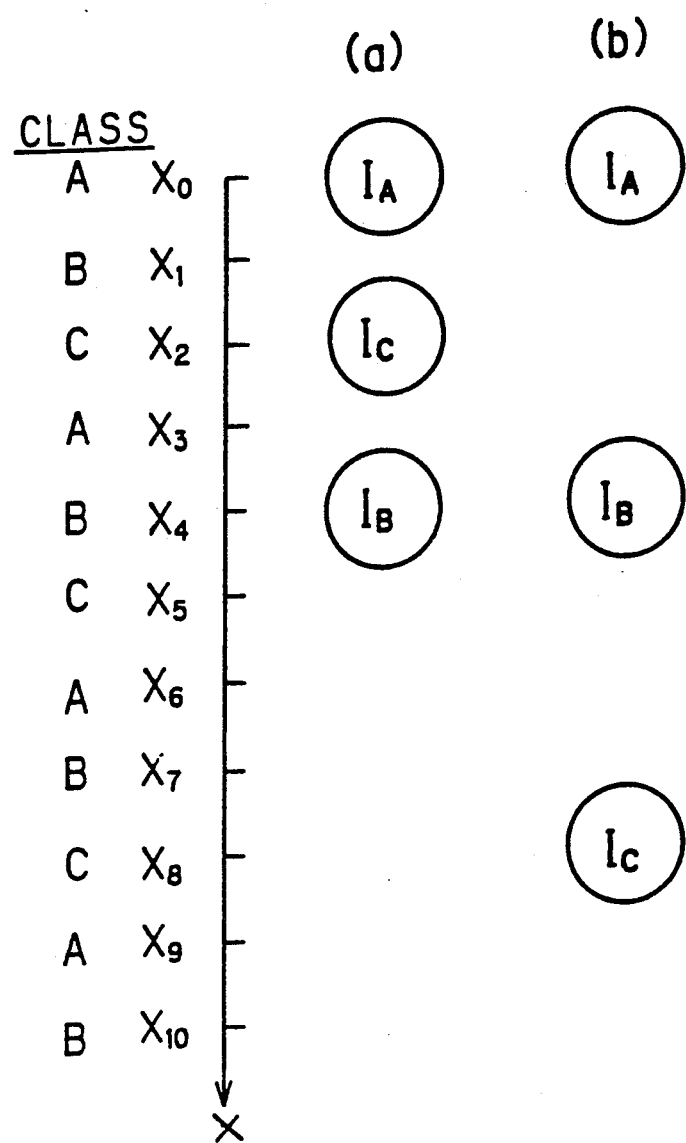
Figure 10D:
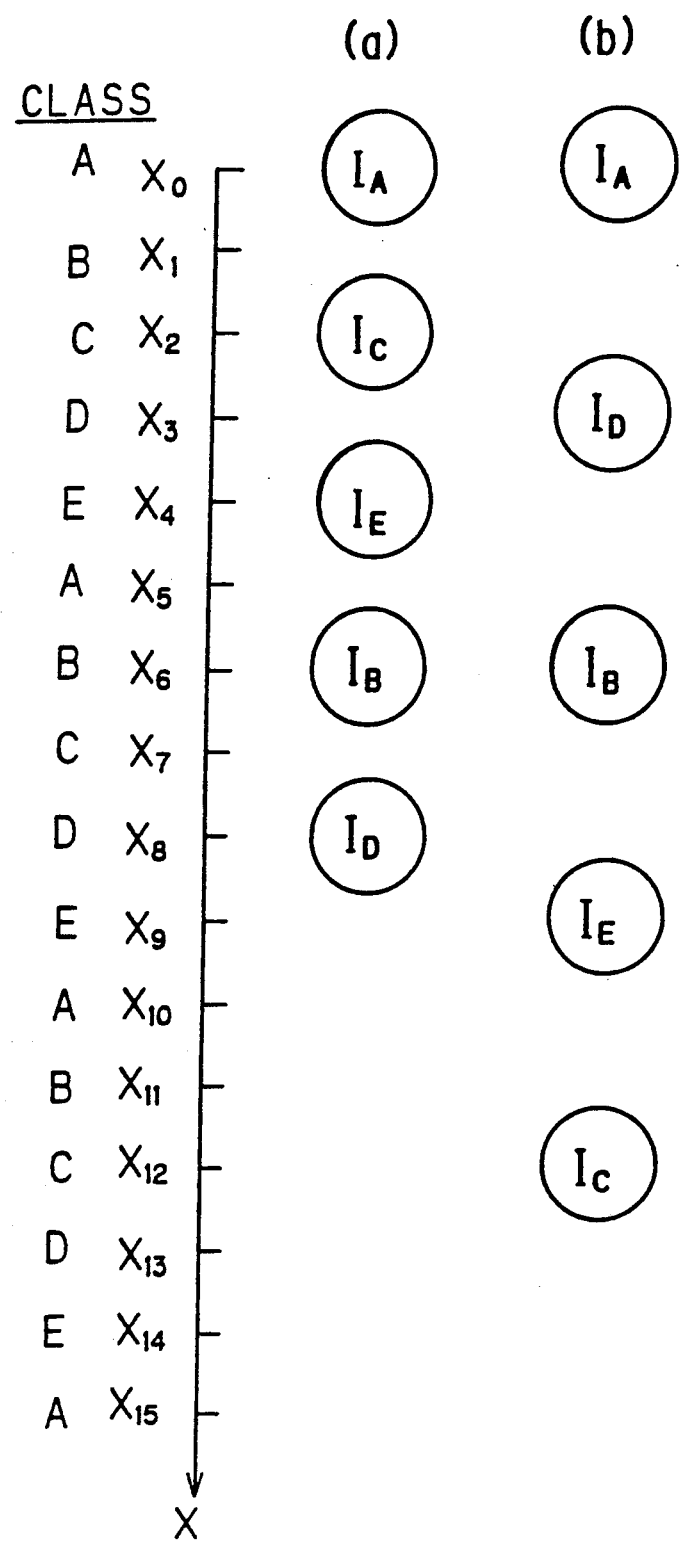
Figure 10E:
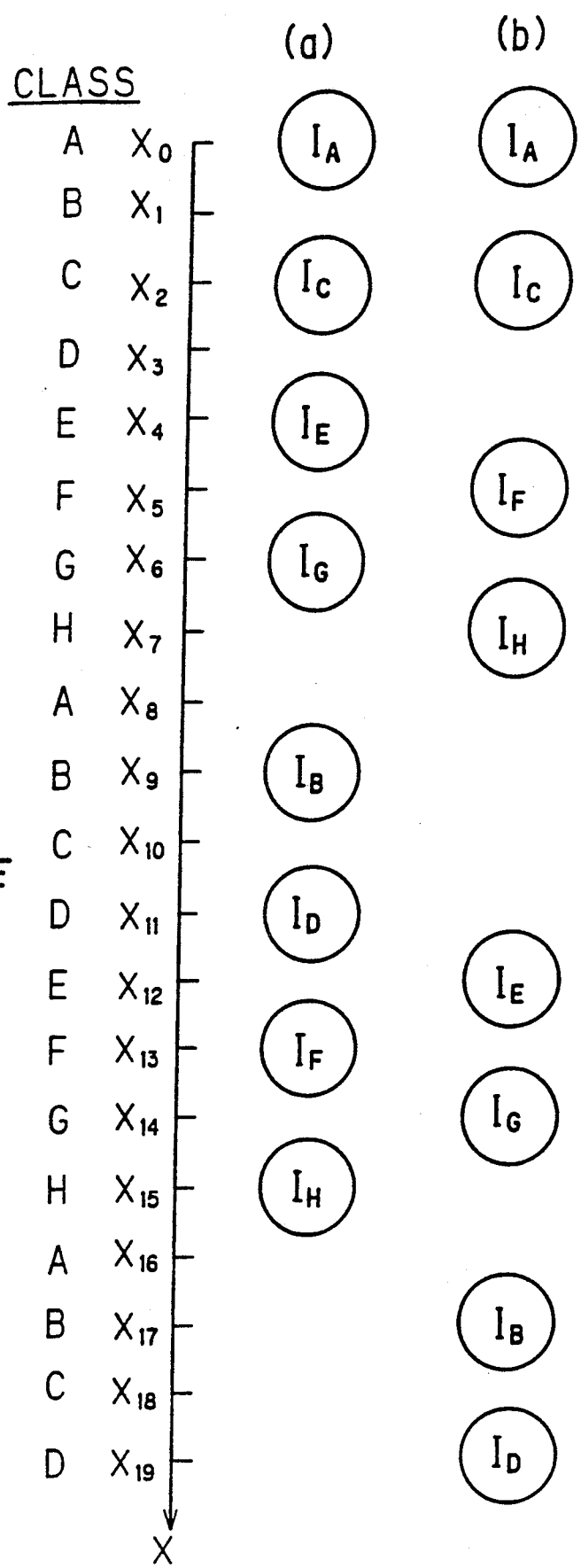

FIG. 9 illustrates an example of interlace scanning. The beam spots $I_A$-$I_D$ of the first to fourth channels are arrayed so that the beam spot intervals are 2p, 3p and 2p. In a first scanning operation, the beam spots $I_A$-$I_D$ run in the main scanning direction y at the subscanning positions $x_0$, $x_2$, $x_5$ and $x_7$, respectively. In this main scanning operation, the optical beams $L_a$-$L_b$ are separately on-off controlled by the AOM's 451-454 so as to expose the recording surface along the main scanning lines. In a second scanning operation, the beam spots $I_A$-$I_D$ are arranged at subscanning positions $x_4$, $x_6$, $x_9$ and $x_{11}$. The feed pitch in the subscanning direction between the first and second scanning operations is 4p. In general, when the number of beam channels is $N_C$, the feed pitch in the subscanning direction in $N_C$·P. The initial positions of the beam spots $I_A$-$I_D$ in the first to fourth scanning operations are different from each other in FIG. 9 only for convenience of illustration. The initial positions are actually equal to each other.

By alternately repeating the main scanning operation and the subscanning operation as shown in FIG. 9, each scanning line is scanned once and only once. A class shown at the left hand side of the subscanning coordinate x in FIG. 9 indicates which optical beam scans the subscanning position. The interlace scanning method permits efficient scanning with a plurality of beam spots without interference therebetween.

A lens having sinusoidal distortion characteristics (an fsinθ lens) is used as the scan lens 8. This way, the scanning pitch p in the subscanning direction does not change during the main scanning operation. If an fθ lens is used, the scanning pitch in the subscanning direction is changed at both sides of the field angle.

As shown in FIG. 9, the beam spots $I_A$-$I_D$ are aligned in the subscanning direction x. This makes the main scanning positions of the beam spots $I_A$-$I_D$ equal to each other such that four control signals for controlling the AOM's 451-454 can always be synchronized with each other. In other words, if the beam spots $I_A$-$I_D$ deviate from each other in the main scanning direction y, four delay circuits should be installed to delay the control signals supplied to the AOM's 451-454 according to the respective deviations. On account of the above items, the beam spots $I_A$-$I_D$ should be lined up in the subscanning direction x and an fθ lens should be used as the scan lens 8.

FIGS. 10A-10E illustrate arrays of beam spots in various interlace scanning methods There are many interlace scanning methods. The methods are different in terms of the number of beam spots $N_C$ and the beam spot intervals With the beam interval adjusting mechanism of the present invention, the beam spot intervals can be changed while maintaining the spot diameter regardless of the particular interlace scanning method applied.

Figure 11:
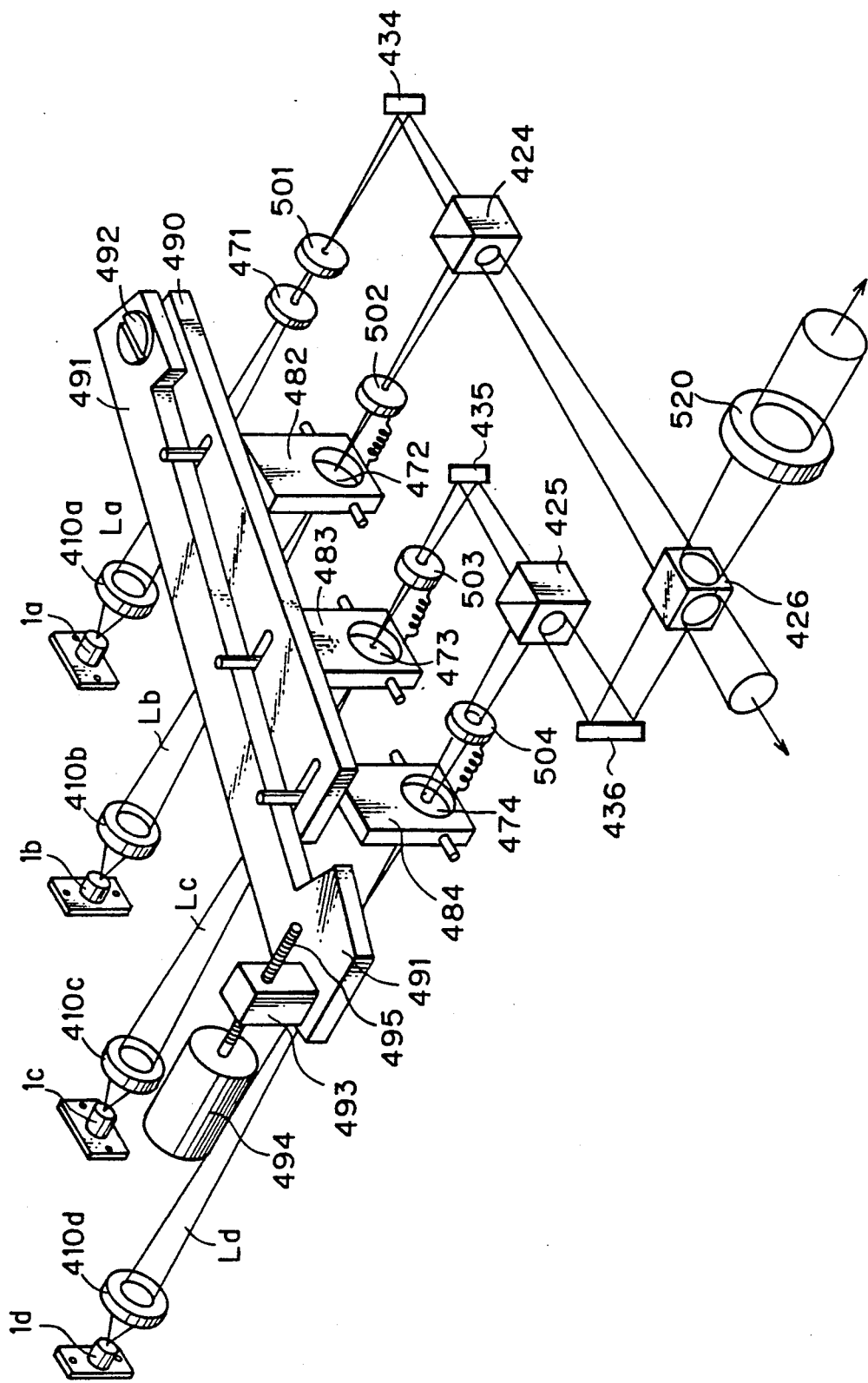
FIG. 11 is a perspective view of a modified version of the multibeam scanning system of FIG. 2A.
Figure 12A:
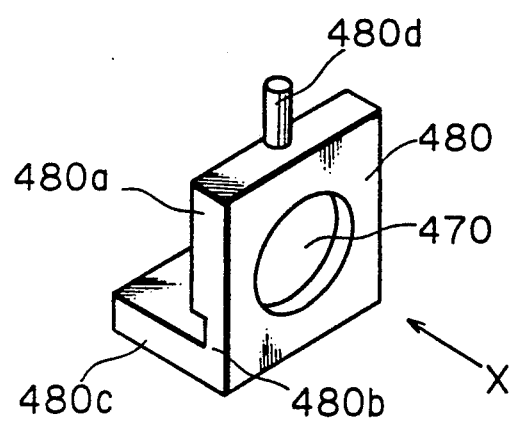
FIG. 12A is a perspective view of a holder for a plane parallel plate.
Figure 12B:
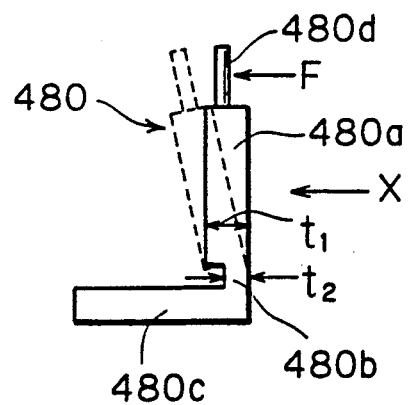
FIG. 12B is a side view of the holder of FIG. 12A.

A single laser beam $L_1$ is split into four optical beams $L_a$–$L_d$ in the multibeam scanning system shown in FIGS. 1, 2A and 2B. But four lasers for generating respective four laser beams $L_a$–$L_d$ may be installed instead. FIG. 11 is a perspective view of a multibeam scanning system with four laser diodes $1a$–$1d$. Optical beam $L_a$–$L_d$ emitted from the laser diodes $1a1d$ are converged by condenser lenses $410a$–$410d$, and are incident on the second plane parallel plates 471–474 The multibeam scanning system shown in FIG. 11 does not need the beam splitters and mirrors of FIGS. 2A and 2B. It does not need the first plane parallel plates 441–444, the AOM's 451–454, the decentering lenses 461–464 or the zero order light cutter 510. Since the laser diodes $1a$–$1d$ can on-off control their own laser beams $L_a$–$L_d$, the AOM's are not necessary. When the AOM's are not used, the first plane parallel plates 441–444, the decentering lenses 461–464 and the zero order light cutter 510 are not necessary FIGS. 12A and 12B illustrate another example of a holder for holding a second plane parallel plate. The holder 480 has a supporting portion 480a, a neck portion 480b and a base portion 480c. The portions 480a–480c are made from a single block of material. A plane parallel plate 470 is fixed in the supporting portion 480a. The neck portion 480b is formed between the supporting portion 480a and the base portion 480c. The thickness $t_2$ of the neck portion 480b in the direction of the optical path is smaller than the thickness $t_1$ of the supporting portion 480a. A pin lever 480d is formed at the upper end of the supporting portion 480a.

The base portion 480c is fixed on a base structure (not shown) The pin lever 480d is inserted into a pin guide hole of the pin guide plate 490 (FIG. 2A) and the pin lever 480d is moved by the arm plate 491 in a direction F (FIG. 12B). As a result, the neck portion 480b is elastically deformed, and the supporting portion 480a is turned round the neck portion 480b as shown in broken lines in FIG. 12B. The neck portion 480b and the fulcrum pins 482a–484a have similar functions. They can both be referred to as "a fulcrum axis". Use of the holder 480 does not affect the relationship between the displacement s of the arm plate 491 and the parallel displacement $\Delta Z$ of the optical beam as described before.

The holder 480 is elastically deformed when the pin lever 480d is pressed in the direction F. Thus, when the arm 491 is returned, the supporting portion 480a returns to a vertical position without the springs 482c–484c. When the holder is made of metal, the deformation of the neck portion 480b is kept within the elastic limit of the metal.

The multibeam scanning system described above uses four optical beams. But the present invention can be applied to systems which use other than four optical beams.

Further, the fulcrum for the pin guide plate 490 and the arm plate 491, that is, the connection pin 494, need not be located above the optical path of the first channel. The fulcrum can be located at another position. As described before with reference to equations (8a)–(8c), the displacements of the beam spots $I_A$–ID $_{on}$ the recording surface 10 are proportional to the distances from the fulcrum to the optical paths of the respective channels. Therefore, the fulcrum can be placed anywhere if ratios of the distances from the fulcrum to the optical paths can be represented in integers For example, the fulcrum can be located above one of the optical paths of the second to fourth channels, or above any position other than the optical paths. However, if the fulcrum is located above one of the optical paths of the first to fourth channels as in the above embodiment, the second plane parallel plate for that channel need not be inclined.

Other mechanisms for inclining the holders 482–484 may be used. When two optical beams are used, the mechanism may be constructed such that an inclination of a plane parallel plate for one of the two optical beams is adjusted by the mechanism According to the above embodiment, the beam interval adjusting mechanism is simple because the displacements of the beam spots are proportional to the displacements of the application points $P_a$ (FIGS. 4A–4C). When a plurality of plane parallel plates for a plurality of optical beams are inclined, and when the application points for inclining the plates are displaced by integral ratios in a direction which is parallel to the optical paths, the intervals between the spots on the recording surface are changed according to the integral ratios.

The scan lens 8 shown in FIG. 8 and the collimator lens 520 shown in FIGS. 2A and 2B may be replaced by a single image forming lens The lens system may be any image forming system which focuses the composite optical beams $L_2$ on the recording surface 10.

As described above, the multibeam scanning system is constructed such that a plurality of optical beams pass through the plane parallel plates before being combined into a composite optical beam, and such that the beam spot intervals on an image formation plane (or the recording surface) are changed by adjusting the inclination of the plane parallel plates. In other words, the beam spot intervals can be changed without using a zoom lens. Accordingly, the beam spot intervals can be changed while maintaining the diameter of the spots.

Figure 13:
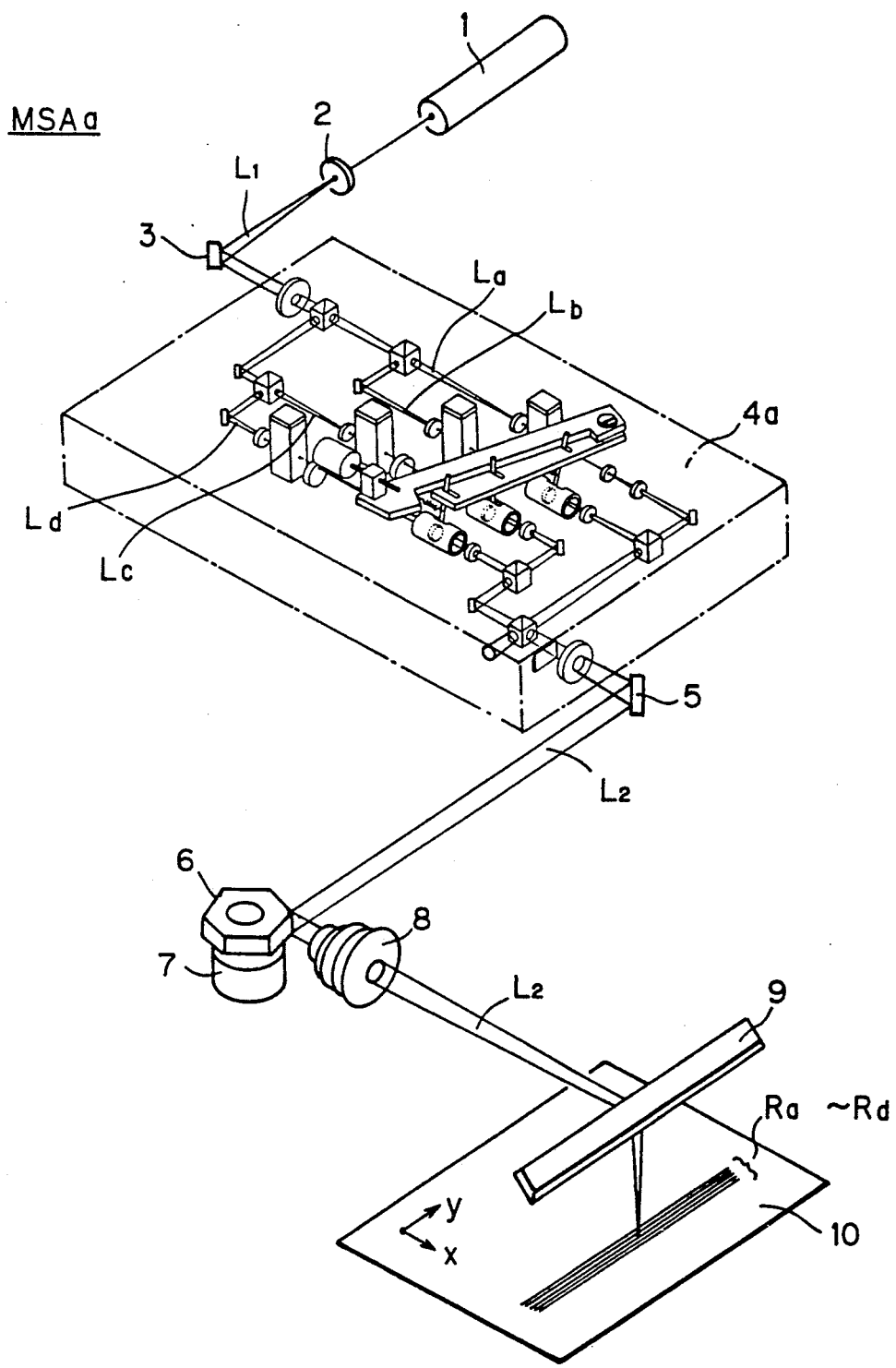
FIGS. 13 and 14A are perspective views of another multibeam scanning system in accordance with the present invention.

FIG. 13 is a perspective view of a second multibeam scanning system MSAa in accordance with the invention. The system MSAa has a multibeam control mechanism 4a. The mechanism 4a is a modified version of the multibeam scanning system 4 shown in FIG. 2A. In particular, the mechanism 4a has first prisms 601–604, prism holders 612–614 and second prisms 621–624, instead of the second plane parallel plates 471–474, the holders 482–484 and the third plane parallel plates 501–504 of the mechanism 4.

The mechanism 4a comprises the first prisms 601–604, the prism holders 612–614, the second prisms 621–624, the pin guide plate 490, the arm plate 491, the nut portion 493, the motor 494 and the screw 495. For convenience of illustration., the pin guide plate 490, the arm plate 491, the nut portion 493, the motor 494 and the screw 495 are not shown in FIG. 14A.

The first prisms 602–604 for the optical beam $L_B$–$L_D$ of the second to fourth channels are fixed in the prism holders 612–614, respectively. The prism holder 613 (FIG. 13) has an outer cylinder 613a and an inner cylinder 613b which can be moved smoothly in the outer cylinder 613a. The first prism 603 is fixed in the inner cylinder 613b. The inner cylinder 613b has a pin lever 613c extending outwardly from its outer surface The pin lever 613c passes through a slit 613d which is formed along the central axis of the outer cylinder 613a. When the pin lever 613c is moved along the optical path, that is, along the central axis of the cylindrical holder 613, the first prism 603 is smoothly moved in a parallel manner along the optical path.

Figure 14A:
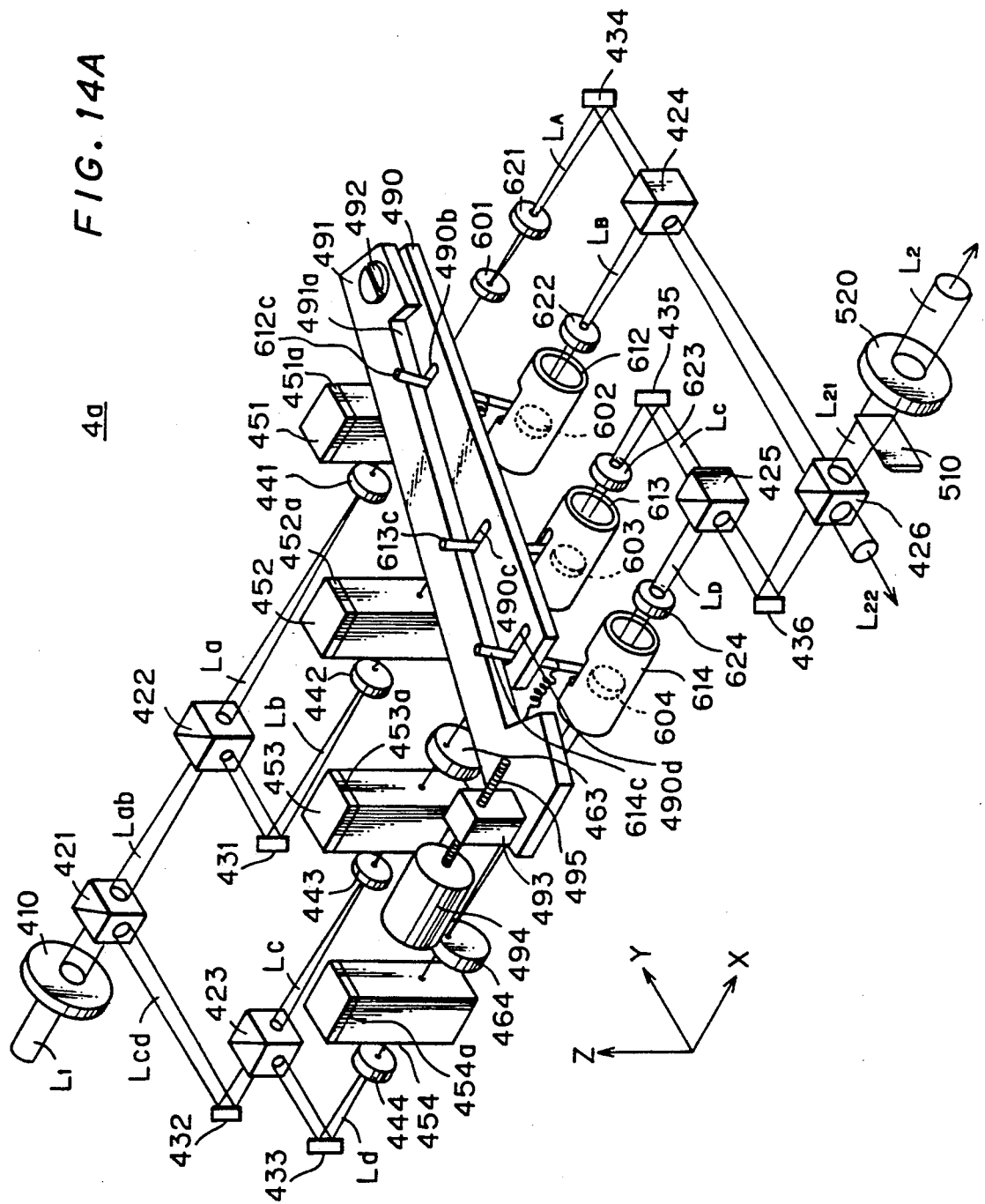
Figure 16:
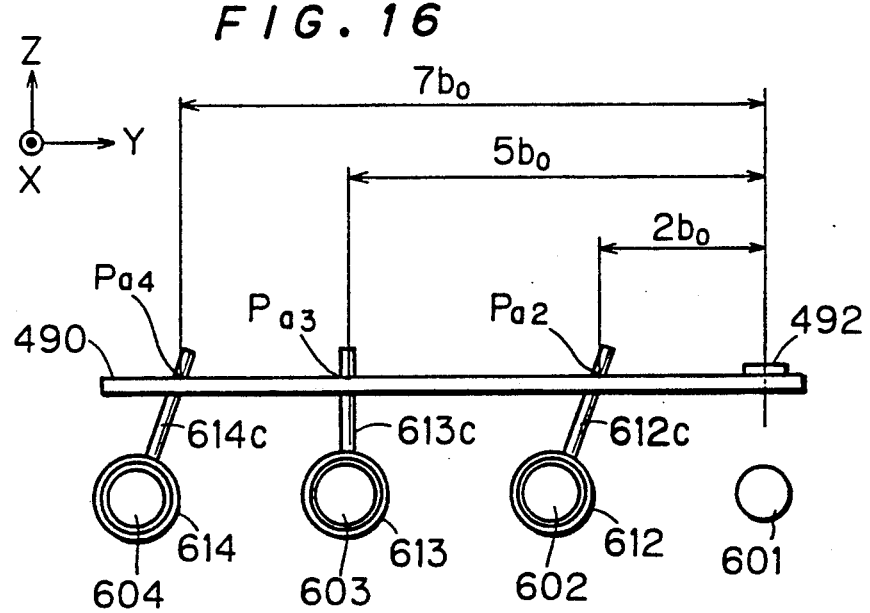
FIG. 16 is a front view showing prism holders and their pin levers.

The pin levers 612c-614c of the respective holders 612-614 are inserted in the pin guide holders 490b-490d. As illustrated in FIG. 16, the first prisms 601-604 are placed at regular intervals along the Y direction. The pin levers 612c and 614c are set to be rotated in a clockwise direction at respective predetermined angles from the upright position. Ratios of the distances from the fulcrum of the arm plate 491 (the center of the connection pin 492) to application points $P_{a2}$-$P_{a4}$ of the pin levers 612c-614c are 2:5:7. The application points $P_{a2}$-$P_{a4}$ are the points at which the pin levers 612c-614c are pushed by the side surface 491a of the arm plate 491 (FIG. 14A). This arrangement of the application point $P_{a2}$-$P_{a4}$ is determined on account of the interlace scanning method described before.

Figure 15:
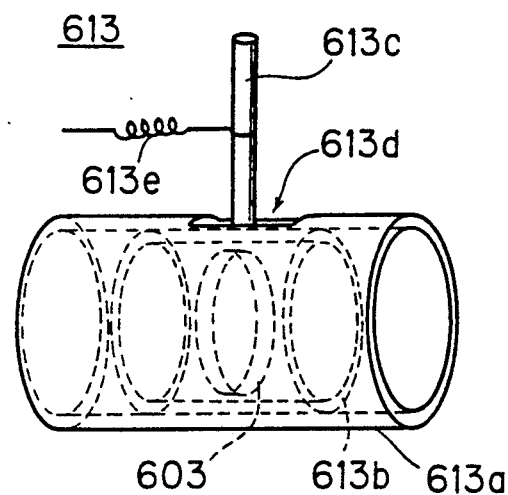
FIG. 15 is a perspective view of a prism holder.

The pin levers 612c-614c are connected to supporting structures (not shown) formed at a lower surface of the pin guide plate 490 by springs 612e-614e (FIG. 15). Consequently, the pin levers 612c-614c are pulled in the direction ($-X$) and thereby are pressed against the arm plate 491.

The fulcrum of the arm plate 491, or the center of the connection pin 492, is located directly above the optical path of the first channel optical beam $L_a$. The fulcrum and the three pin levers 612c-614c are horizontally aligned. The ratios of the distances from the fulcrum to the application points $P_{a2}$-$P_{a4}$ are 2:5:7, as stated before.

When the screw 495 is rotated by the motor 494, the arm plate 491 rotates within a horizontal plane such that the pin levers 612c-614c are pushed in the X direction As a result, the first prisms 602-604 are moved in the X direction. The parallel movement of the first prisms 602-604 changes the intervals between the beam spots of the beam $L_A$-$L_D$, as described later in detail. The first prism 601 is not moved in this embodiment; it is installed to make the optical path length of the first channel equal to those of the second to fourth channels.

The optical beams $L_A$-$L_D$ leaving the first prisms 601-604 pass through the second prisms 621-624, respectively. The second prisms 621-624 make the optical paths which were inclined by the first prisms 601-604 again parallel to the X direction The beam spot intervals are adjusted by the beam interval adjusting mechanism as follows.

Figure 17A:
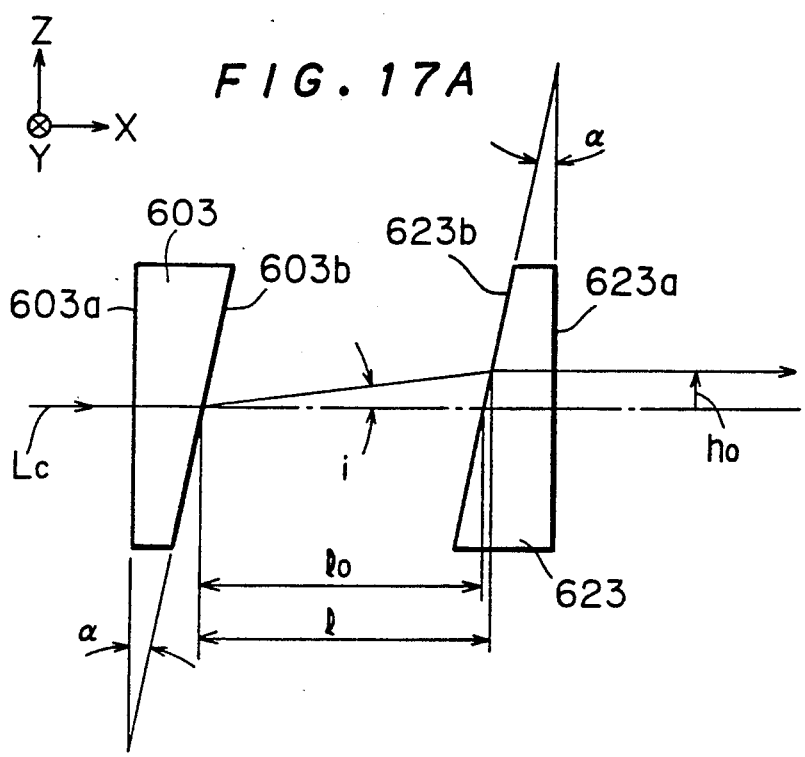
FIGS. 17A and 17B schematically illustrate a relationship between movement of a prism and parallel displacement of an optical beam.
Figure 17B:
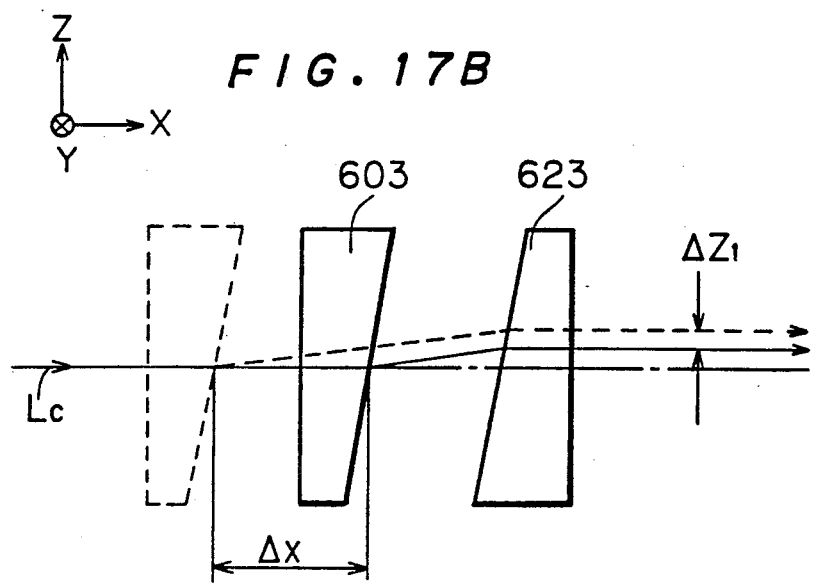

FIGS. 17A and 17B schematically illustrate the parallel displacement caused by the parallel movement of the first prism. In FIG. 17A, the optical beam $L_C$ is transmitted in the X direction and the first prism 603 and the second prism 623 are placed on the optical path of the optical beam $L_C$. The first prism 603 and the second prism 623 each have a trapezoidal cross section with an apex angle $\alpha$ on the X-Z plane. An inlet side surface 603a of the first prism 603 and an outlet side surface 623a of the second prism 623 are parallel to each other, and are perpendicular to the beam $L_C$. Furthermore, an outlet side surface 603b of the first prism 603 and an inlet side surface 623b of the second prism 623 are parallel to each other, and are inclined at the angle $\alpha$ round the Y axis. In other words, the first prism 603 and the second prism 623 are set up so that they would make a plane parallel plate if they were in contact with each other. The first prism 603 and the second prism 623 are made of the same material.

A deflection angle i of the optical beam leaving the first prism 603 is as follows:

$$i = (n-1) \quad (9)$$

where n is the refractive index of the prism.

After passing through the second prism 623, the optical path of the optical beam $L_C$ is again parallel to the X direction. A parallel displacement $h_O$ of the optical beam $L_C$ caused by the prisms 603 and 623 is determined by the following equation:

$$h_O = \lambda \tan i \quad (10)$$

where $\lambda$ is the distance from a point on the outlet side surface 603b at which the optical beam is emitted to a point on the inlet side surface 623a on which the optical beam is incident. The distance $\lambda$ is almost equal to the distance $\lambda_O$ between the outlet side surface 603b and the inlet side surface 623a.

When the first prism 603 is moved in the X direction by a displacement $\Delta X$ (FIG. 17B), the parallel displacement $\Delta Z_1$ is determined by the following equation:

$$\Delta Z_1 = \Delta X \tan i \quad (11)$$

For example, if the apex angle $\alpha$ of the prisms 603 and 623 is 5°, and the refractive index n for the wavelength of the optical beam $L_C$ is 1.515, then, according to equation (9), the deflection angle i is 2.58°. If the prism 603 is moved 10mm ($=\Delta X$), then according to equation (11), the parallel displacement $\Delta Z_1$ is 0.45mm.

The prisms for the second and fourth channels are set up in the same manner as the prisms 603 and 623. That is, the parallel movements of the first prisms 602 and 604 in the X direction cause parallel movement of the optical beams $L_B$ and $L_D$ in the Z direction, respectively.

The pin levers 612c and 614c are inclined as stated before. But the prisms 602, 604, 622 and 624 are not inclined. Rather, the prisms 602, 604, 622 and are set in the same manner as other prisms 601, 603, 621 and 623. Further, when the pin levers 612c-614c are not displaced by the arm plate 491, the distances $\lambda_O$ from the first prisms to the second prisms are equal to each other.

Figure 18A:
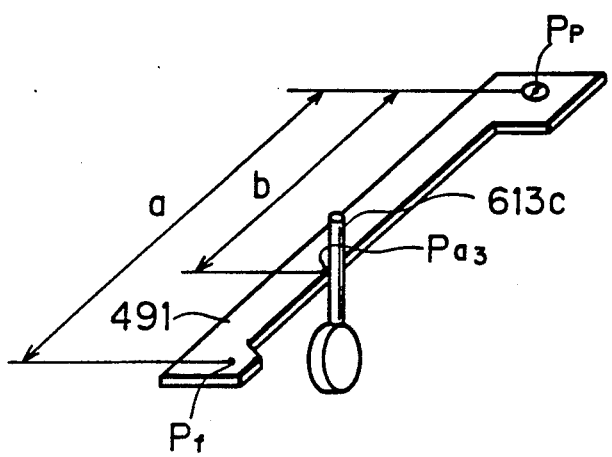
FIGS. 18A and 18B schematically illustrate a relationship between movement of a beam interval adjusting mechanism and displacement of a prism.
Figure 18B:
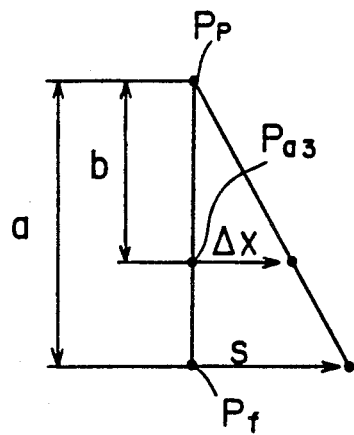

FIGS. 18A and 18B illustrate the relationship between the movement of the arm plate 491 and the displacement of the first prism. The parallel displacement $\Delta X$ of the application point $P_{a3}$ is determined by the following equation, which is the same as equation (2b):

$$\Delta X = bs/a \quad (12)$$

The parallel displacement $\Delta Z_1$ of the optical beam $L_C$ in response to the displacement s of the forcing point $P_f$ of the arm plate 491 is found from equations (9)-(12) as follows:

$$\Delta Z_1 = bs/a \, \tan[\alpha(n-1)] \quad (13)$$

Since the values a, b and n are constants, equation (13) can be rewritten as follows:

$$\Delta Z_1 = k_2 sb \quad (14)$$

in short, the parallel displacement $\Delta Z_1$ is linearly related to the displacement s.

Assuming that the distance from the optical path of the first channel to the application point $P_{a2}$ is $2b_O$ (FIG. 16), the ratios of the distances from the opt path of the first channel to the application point $P_{a2}$-$P_{a4}$ are $2b_O$:$5b_O$:$7b_O$. The parallel displacements $\Delta Z_B$-$\Delta Z_D$ of the second to fourth channel optical beams $L_B$–$L_D$ are obtained as follows by substituting the values $2b_O, 5b_O$ and $7b_O$ for the variable b in equation (14):

$$\Delta Z_B = 2k_2 b_O s = 2k_3 s \tag{15a}$$

$$\Delta Z_C = 5k_2 b_O s = 5k_3 s \tag{15b}$$

$$\Delta Z_D = 7k_2 b_O s = 7k_3 s \tag{15c}$$

where the coefficient $k_3 = (k_2 b_O)$ is a constant. These equations (15a)–(15c) are similar to equations (8a)–(8c). That is, the ratios of the intervals between the beam spots on the recording surface 10 are maintained at 2:3:2 with the multibeam scanning system MSAa in the same manner as with the multibeam scanning system MSA.

Figure 19:
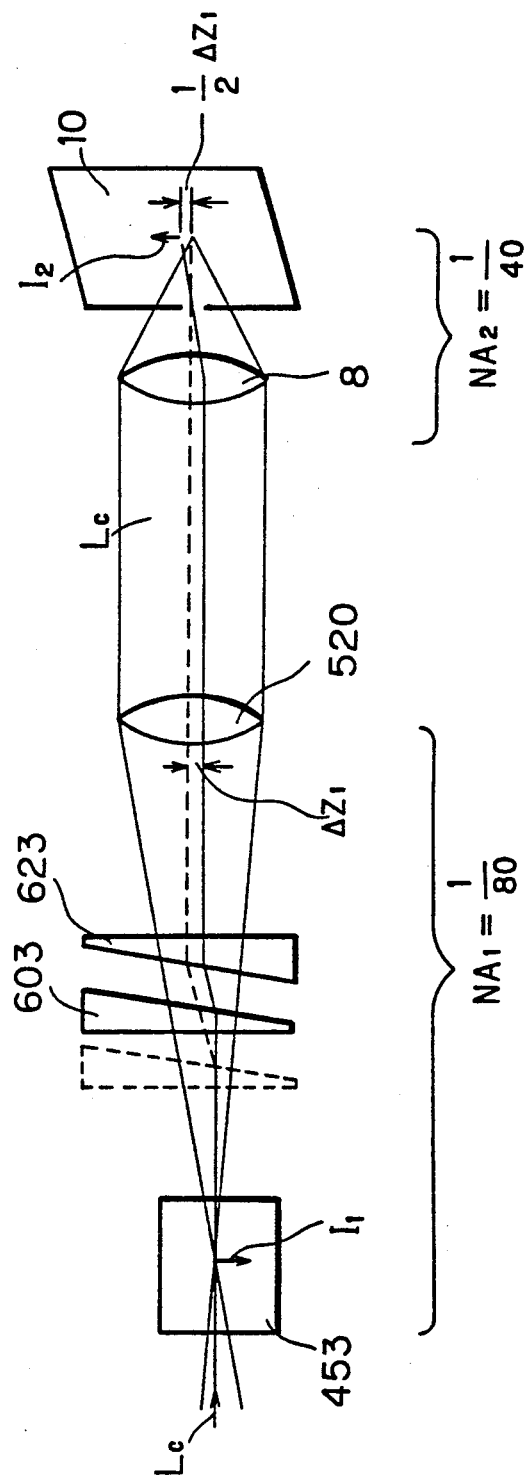
FIG. 19 schematically illustrates a relationship between parallel displacement of an optical beam and displacement of a beam spot on a surface to be scanned.

FIG. 19 illustrates the relationship between the parallel displacement of the optical beam in the beam interval adjusting mechanism and the displacement of the beam spot on the recording surface. In this regard, FIG. 19 is similar to FIG. 6. Since the lateral magnification with respect to the optical beams $L_C$ and $L_2$ is $\frac{1}{2}$, the beam spot on the recording surface 10 is displaced by $\frac{1}{2} \cdot 66 Z_1$ in response to the parallel displacement $\Delta Z_1$ caused by the movement of the first prism 603.

Accordingly, only if an optical beam passing through the first prism 603 and 623 is a non-parallel bundle of rays, that is, only if it is a convergent ray or a divergent ray, the beam spot on the recording surface 10 is displaced in response to the parallel displacement of the optical beam passing through the prisms 603 and 623. The prisms 603 and 623 can be located at arbitrary positions between the AOM 453 and beam combining means for combining the four optical beams.

The first and second prisms 603 and 623 move the optical beam $L_C$ in a parallel manner. But the prisms do not change the size of the image $I_1$ on the image formation plane in the AOM 453. Therefore, movement of the prism 603 does not change the size of the image $I_2$. Further, spherical abberation and astigmatism caused by the prisms 603 and 623 may be neglected.

The relationship between the parallel displacement of the optical beam caused by the first and second prisms and the displacement of the beam spot on the recording surface is common to the second to fourth channels. As in the first preferred embodiment of the invention, when the ratios of the displacements of the optical beams $L_B$–$L_D$ in the X direction are 2:5:7, the ratios of the displacements of the beam spots on the recording surface 10 are also 2:5:7.

According to this embodiment, when the arm 491 is moved by the motor 494, the intervals between the beam spots increase or decrease while the ratios thereof are maintained and while the size of the beam spots $I_A$–$I_D$ on the recording surface is maintained.

Figure 14B:
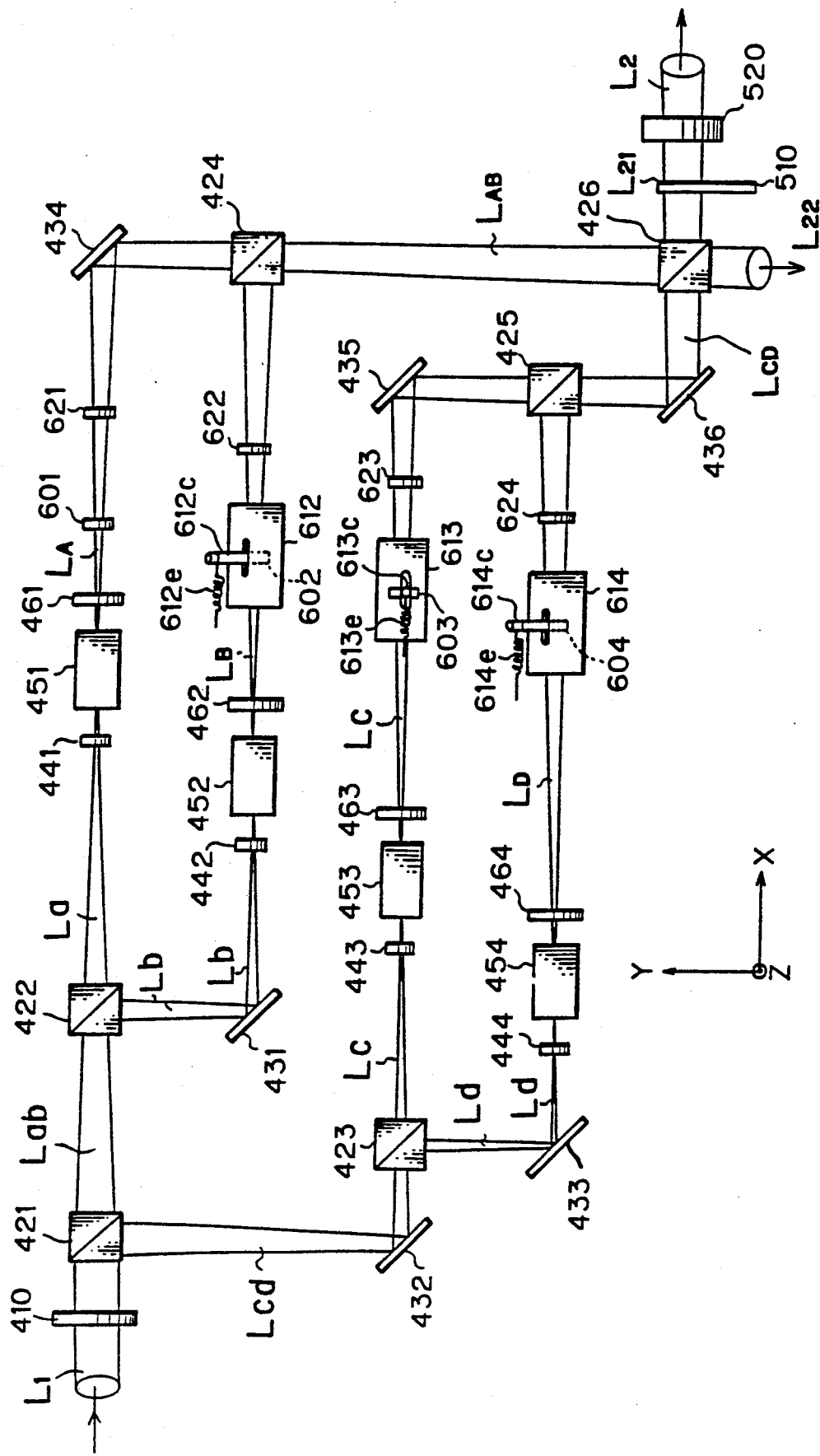
FIG. 14B is a plan view of the system of FIGS. 13 and 14A.
Figure 20:
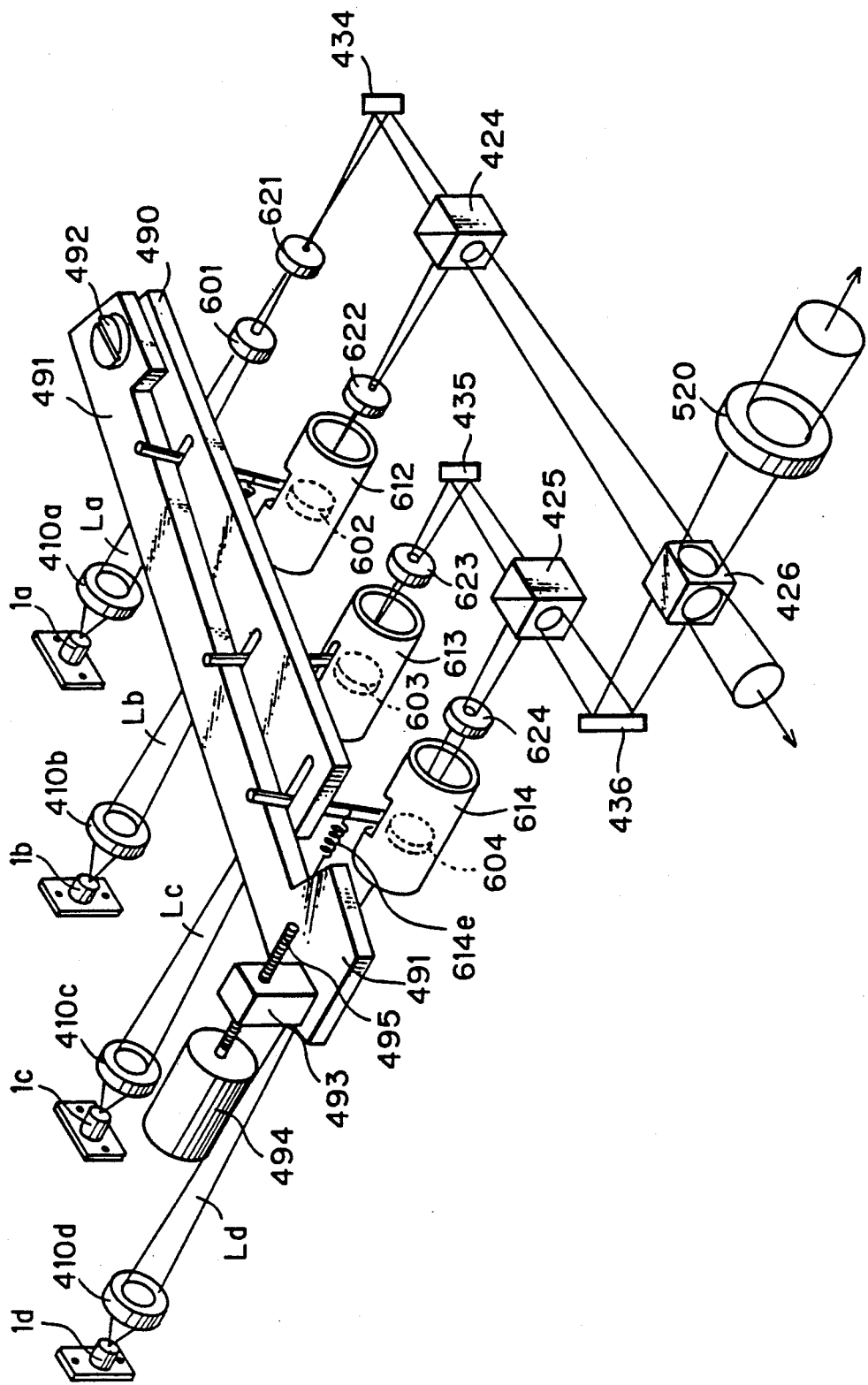
FIG. 20 is a perspective view of a modified version of the multibeam scanning system of FIG. 14A.

A single laser beam $L_1$ is split into four optical beams $L_a$–$L_d$ in the multibeam scanning system shown in FIGS. 13, 14A and 14B. But four lasers for generating four laser beams $L_a$–$L_d$ may be installed instead. FIG. 20 (which is similar to FIG. 11) is a perspective view of a multibeam scanning system which has four laser diodes $1_a$–$1_d$.

In the above-described embodiment, the fulcrum for the pin guide plate 490 and the arm plate 491 (that is, the connection pin 494) is located above the optical path of the first channel. But the fulcrum can be placed at other positions. As described before with reference to equations (15a)–(15c), the displacements of the beam spots $I_A$–$I_D$ on the recording surface 10 are proportional to the distances from the fulcrum to the application points of the lever pins for the respective channels. Therefore, the fulcrum can be placed anywhere if the ratios of the distances from the fulcrum to the application points are expressed by integers. For example, the fulcrum can be located above one of the optical paths of the second to fourth channels, or above any position other than the optical paths. However, if the fulcrum is located above one of the optical paths of the first to fourth channels as in the above embodiment, the first prism for that channel does not need to be moved to adjust the intervals between the spots, and the position of a beam spot on the recording surface is not changed when the intervals are adjusted.

The pin levers may be set upright if the ratios of the distances from the fulcrum to the application points are represented in integers. In this case, the optical beam $L_A$–$L_D$ are arrayed so that the ratios of the intervals between the beams $L_A$–$L_D$ are represented in integers.

The present invention is not limited to the combination of the pin guide plate 490 and the arm plate 491. Other mechanisms for moving the first prisms in a parallel manner may be used. When two optical beams are used, the mechanism may be constructed such that a prism for one of the two optical beams is parallel moved by the mechanism. However, according to the above embodiment, the structure of the beam interval adjusting mechanism becomes simple because the displacements of the beam spots on the recording surface are proportional to the displacements of the application point $P_{a2}$–$P_{a4}$ (FIG. 16) while the application points $P_{a2}$–$P_{a4}$ are moved in a direction which is parallel to the optical paths. When a plurality of prisms for a plurality of optical beams are moved in the parallel direction, and when the application points for moving the prisms are displaced by integral ratios in the parallel direction, the intervals between the spots on the recording surface are changed according to the integral ratios.

The inlet side surface 603a of the first prism and the outlet side surface 623a of the second prism are perpendicular to the optical path as shown in FIG. 18A. But FIG. 21 illustrates an alternative embodiment wherein an inlet side surface of a first prism 600 and an outlet side surface of a second prism 620 are parallel to each other, but are not perpendicular to the optical path. The deflection angle i of the optical beam leaving the first prism 600 is determined as follows:

$$i = \phi - \alpha + \sin^{-1}\{(n^2 - \sin^2\alpha)^{\frac{1}{2}} x \sin\alpha) - \cos\alpha \sin\alpha)\} \tag{16}$$

where $\phi$ is an incident angle of the optical beam L incident on the first prism 600. Equation (9) is an approximation of equation (16) when $\phi = 0$. If the apex angle $\alpha$ is small enough, error due to the approximation in equation (9) is negligible.

The angles $\alpha$ and $\phi$ are such that the optical beam L is not totally reflected by the outlet side surface 600b of the first prism 600. The value of the apex angle $\alpha$ is desirably between 5° and 10°. This way, the optical beam L is not totally reflected by the outlet side surface 600b.

Preferably, the first and second prisms each deflect an optical beam at the same deflection angle, and would constitute a plane parallel plate if they were in contact with each other. Instead of moving the first prisms in the X direction as shown in FIGS. 17A and 17B, the prisms may be moved in the −X direction. Alternatively, the second prisms may be moved in the X direction or the −X direction. Further, either of the prisms may be moved in the Z direction. FIG. 22 illustrates a case where the first prism 600 is moved in the Z direction. The relationship between a parallel displacement $\Delta Z_p$ of the first prism 600 in the Z direction and the displacement $\Delta Z_p$ of the first prism 600 in the Z direction and the displacement $\Delta Z_1$ of the optical beam is as follows:

$$\Delta Z_1 = \Delta Z_p \tan\alpha \tan i \quad (17)$$

where $\alpha$ is the apex angle of the prism 600.

Accordingly, the intervals between the beam spots can be changed by relatively moving a pair of first and second prisms in a parallel manner so that a distance between inner opposite surfaces of the first and second prisms (the surfaces 600b and 620b in FIG. 22) is changed. The parallel movement for this purpose can be done along a line on an arbitrary plane including the topical path, such as the X-Y plane or the X-Z plane.

Figure 23:
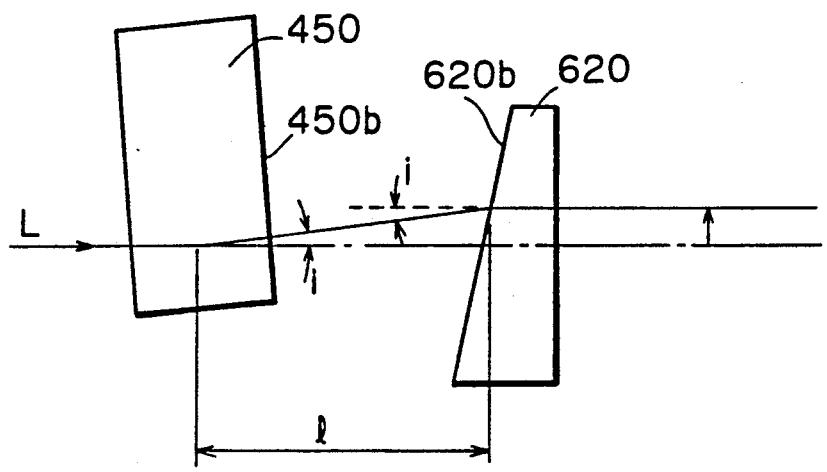

One of the prisms in the above embodiment may be replaced by the AOM 450, as illustrated in FIG. 23. In this case, the decentering lenses 461–464 as well as the first prisms 601–604 (FIGS. 13, 14A, 14B) are omitted. In FIG. 23, the prism 620 is fabricated and placed such that the deflection angle i caused by the prism 620 is equal to a diffraction angle caused by the AOM 450. As a result, an optical path of the beam incident on the AOM 450 becomes parallel to an optical path of the beam leaving the prism 620. The intervals between the beams spots can be adjusted by moving the prism 620 in a parallel manner so that the distance between an inlet side surface 620b of the prism 620 and an image formation plane in the AOM 450 is changed.

Figure 24A:
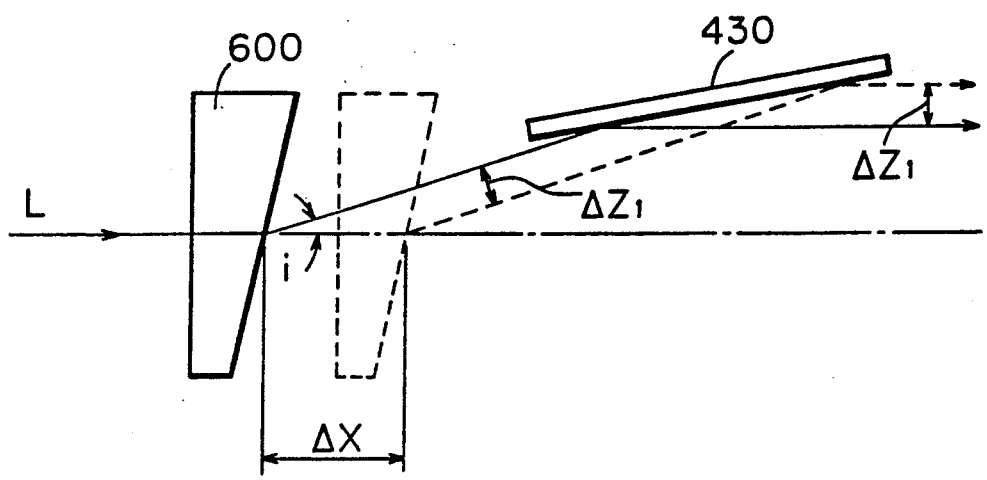

FIG. 24A illustrates an alternative embodiment wherein the second prism is replaced by a mirror 430. In this case, the second prisms 621–624 (FIGS. 13, 14A and 14B) are omitted. The mirrors 434 and 435, and the beam splitters 424 and 425 in those figures function as the mirror 430 in FIG. 24A. The optical beam L deflected by the prism 600 at the deflection angle i is reflected by the mirror 430 in a direction which is parallel to that of the optical beam which is incident on the prism 600. The relationship between the displacement $\Delta X$ and the displacement $\Delta Z_1$ is determined by the following equation:

$$Z_1 = \Delta X \sin i \quad (18)$$

Figure 24B:
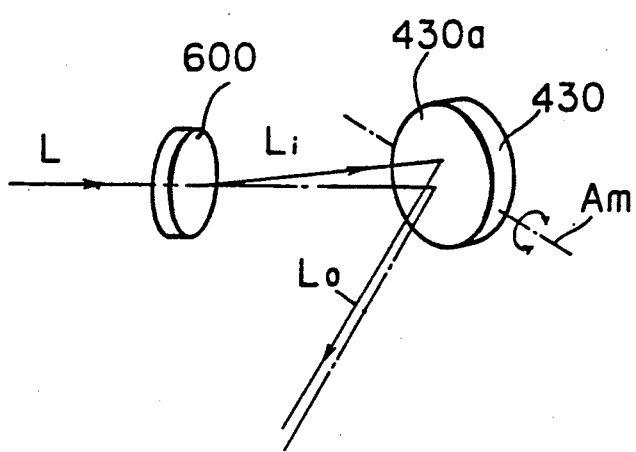

By turning the mirror 430 on an axis $A_m$, as shown in FIG. 24B, the optical path of the beam $L_O$ reflected by the mirror 430 becomes parallel to that of the beam L which is incident on the prism 600. The axis $A_m$ is a line at which a first plane and a second plane intersect each other, the first plane being perpendicular to a normal of a reflection surface 430a of the mirror 430, the second plane being parallel to a plane which includes the reflected beam $L_O$ and a beam $L_i$ which is incident on the mirror 430. In concrete terms, the mirrors 434 and 435, and the beam splitters 424 and 425 are turned in the manner shown in FIG. 24B to make the optical paths of the reflected beams parallel to those beams which are incident on the first prisms. Since the deflection angle i is not changed as the prism 600 is moved in a parallel manner, the mirror 430 is fixed after its inclination is once adjusted as shown in FIG. 24B.

Figure 25:
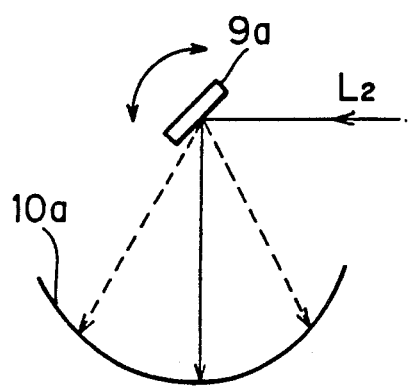
FIG. 25 is a diagram of a recording surface.

The foregoing embodiments use a flat recording surface. But, as illustrated in FIG. 25, the present invention may be used with a recording surface which is an inner surface of a static cylinder (or a part of it).

According to the second preferred embodiment of the present invention, a plurality of optical beams are deflected by first and second deflection means, and the first and second deflection means are relatively displaced in a parallel manner, whereby the intervals between beam spots on an image formation plane are changed. With the present invention, the intervals between the beam spots can be changed without a zoom lens. Therefore, the intervals can be changed while maintaining the diameter of the spots.

Although the present invention has been described and illustrated in detail, it is clearly understood that the same is by way of illustration and example only and is not to be taken by way of limitation. The spirit and scope of the present invention should be limited only by the appended claims.

What is claimed is:

1. An optical beam scanning system for scanning a recording surface with a plurality of optical beams, the system comprising:
   means for producing a plurality of optical beams each of which is a non-parallel bundle of rays;
   means for receiving said plurality of optical beams, said receiving means comprising at least one beam interval adjusting means, each said beam interval adjusting means being associated with a respective optical path of said plurality of optical beams to adjust an interval between beam spots on a recording surface, each said adjusting means comprising: (a) a plane parallel plate disposed in its associated optical path and (b) turning means for turning said plane parallel plate on a turning axis associated with said plate which is perpendicular to its respective associated optical path;
   means for combining said optical beams to form a composite optical beam;
   periodical deflection means for periodically deflecting said composite optical beam; and
   an image formation lens system for focusing said composite optical beam on said recording surface.

2. An optical beam scanning system in accordance with claim 1, wherein
   said turning means turns said plane parallel plate by moving an application point of a member coupled to a respective plane parallel plate in a first direction so as to turn the plane parallel plate about the turning axis, said first direction being parallel to the respective associated optical path, said application point of said member being located a prescribed distance in a second direction from the respective associated turning axis, said second direction being perpendicular to said optical path and said turning axis.

3. An optical beam scanning system in accordance with claim 2, wherein
   said beam interval adjusting means has at least two plane parallel plates and at least two application points for two optical beams, and
   said turning means moves said application points by respective displacements, the ratios of said displacements being represented in integers.

4. An optical beam scanning system in accordance with claim 3, wherein
   said turning means further comprises holders for holding said plane parallel plates, said application points being applied to respective parts of said holders, aid turning means further comprising a rotatable turning plate for moving said application points in said first direction.

5. An optical beam scanning system for scanning a recording surface with a plurality of optical beams, the system comprising:

means for producing a plurality of optical beams each of which is a non-parallel bundle of rays;

a plurality of beam interval adjusting means, each said beam interval adjusting means being associated with a respective optical path of said plurality of optical beams to adjust intervals between beam spots on a recording surface, each said adjusting means comprising: (a) a plane parallel plate disposed in its associated optical path and (b) turning means for turning said plane parallel plate on a turning axis associated with said plate which is perpendicular to its respective associated optical paths;

means for combining said optical beams to form a composite optical beam;

periodical deflection means for periodically deflecting said composite optical beam; and an image formation lens system for focusing said composite optical beam on said recording surface.

6. An optical beam scanning system in accordance with claim 5, wherein said turning means turns said plane parallel plate by moving an application point of a member coupled to a respective plane parallel plate in a first direction so as to turn the plane parallel plate about the turning axis, said first direction being parallel to the respective associated optical path, said application point of said member being located a prescribed distance in a second direction from the respective associated turning axis, said second direction being perpendicular to said optical path and said turning axis.

7. An optical beam scanning system in accordance with claim 6, wherein said turning means moves said application points by respective displacements, the ratios of said displacements being represented in integers.

8. An optical beam scanning system in accordance with claim 7, wherein said turning means further comprises holders for holding said plane parallel plates, said application points being applied to respective parts of said holders, said turning means further comprising a rotatable turning plate for moving said application points in said first direction.

9. Apparatus for scanning a recording surface with a plurality of optical beams, the apparatus comprising:

means for producing a plurality of optical beams, each optical beam having an optical axis and being a non-parallel bundle of rays;

means for adjusting the interval between beams on the recording surface, the adjusting means comprising a plurality of receiving means, each associated with a respective optical path of said plurality of optical beams and each receiving a respective one of said plurality of optical beams at least all but one of said receiving means changing the optical axis of the respective optical beam by a respective amount;

means for combining each of said adjusted optical beams from said adjusting means to form a composite optical beam;

periodic deflection means for periodically deflecting said composite optical beam, and image formation means for focusing said composite optical beam on said recording surface.

10. The apparatus in accordance with claim 9, wherein all said receiving means but said one comprise a plane parallel plate disposed in its associated optical path and turning means for turning said plane parallel plate in accordance with said respective amount on a turning axis associated with said plate which is perpendicular to said optical path.

11. The apparatus in accordance with claim 10, wherein said turning means turns said plane parallel plate by moving an application point of a member coupled to a respective plane parallel plate in a first direction so as to turn direction being parallel to the respective associated optical path, said application point of said member being located a prescribed distance in a second direction from the respective associated turning axis, said second direction being perpendicular to said optical path and said turning axis.

12. The apparatus recited in claim 10, wherein said one receiving means comprises a plane parallel plate.

* * * * *